United States Patent [19]
Ohkubo et al.

[11] Patent Number: 6,065,001
[45] Date of Patent: May 16, 2000

[54] INFORMATION ASSOCIATING APPARATUS AND METHOD

[75] Inventors: Masaaki Ohkubo; Masayuki Sugizaki; Takafumi Inoue; Kazuo Tanaka, all of Tokyo, Japan

[73] Assignee: Nippon Telegraph and Telephone Corporation, Tokyo, Japan

[21] Appl. No.: 09/083,690

[22] Filed: May 21, 1998

[30] Foreign Application Priority Data

May 22, 1997 [JP] Japan ...................................... 9-148519

[51] Int. Cl.[7] .................................................. G06F 17/30
[52] U.S. Cl. ................................................................. 707/3
[58] Field of Search ..................................................... 707/2

[56] References Cited

U.S. PATENT DOCUMENTS 5,826,253 10/1998 Brendenberg ................................ 707/2
5,873,118 10/1998 Letwin ...................................... 711/156

OTHER PUBLICATIONS

M. Ohkubo et al., "Extracting the Trends of Information Demands by Analyzing a WWW Search Log", Information Processing Society of Japan SIG Notes 97–DD–7, May 1997.
M. Ohkubo et al., "Extracting Information Needs by WWW Search Log Analysis", 55th National conference of Information Processing Society of Japan, 2AC–5, Sep. 1997.

*Primary Examiner*—Wayne Amsbury
*Attorney, Agent, or Firm*—Pennie & Edmonds LLP

[57] ABSTRACT

An information associating apparatus comprising a query extraction unit which compiles for at least each search user the queries that were used in a past predetermined time interval taken from data comprising queries used in order to search for information from a database; a preprocessing unit which calculates the parameters necessary for calculating the association degree between key words included in queries extracted for each search user by said query extraction unit, and an association degree calculation unit which calculates the association degree between key words using the parameters calculated by the preprocessing unit.

32 Claims, 27 Drawing Sheets

IC1: INFORMATION ASSOCIATING APPARATUS

EXAMPLE OF THE SEARCH RECORD INPUT INTO THE INFORMATION ASSOCIATING APPARATUS IC1

| SEARCH TIME | USER ID | QUERY |
|---|---|---|
| 1997.01.17. 14:54:32 | 1234 | "NEW YEARS CARD" |
| 1997.01.17. 14:54:45 | 1478 | "NEW YEARS CARD" AND "LOTTERY NUMBER" |
| 1997.01.17. 14:54:59 | 1234 | "NEW YEARS GIFT" AND "POST CARD" AND "LOTTERY" |
| 1997.01.17. 14:55:23 | 1234 | "NEW YEARS CARD" AND "LOTTERY" |
| . | . | . |
| . | . | . |
| . | . | . |

EXAMPLE OF THE OUTPUT RESULT OF THE USER-SPECIFIC SEARCH TIME AND QUERY EXTRACTION UNIT 10

| USER ID: 1234 ||
|---|---|
| SEARCH TIME | QUERY |
| 1997.01.17. 14:54:32 | "NEW YEARS CARD" |
| 1997.01.17. 14:54:59 | "NEW YEARS GIFT" AND "POST CARD" AND "LOTTERY" |
| 1997.01.17. 14:55:23 | "NEW YEARS CARD" AND "LOTTERY" |
| ⋮ | ⋮ |

20: MINIMUM TIME INTERVAL CALCULATION UNIT

QUERY PARSING UNIT — 21

MINIMUM TIME INTERVAL COMPUTATION UNIT — 22

FIG.5

EXAMPLE OF THE OUTPUT RESULT OF
THE QUERY PARSING UNIT 21

USER ID:1234

| KEY WORD | SEARCH TIME |
|---|---|
| "NEW YEARS CARD" | 1997.01.17. 14:54:32, 1997.01.17. 14:55:23 |
| "NEW YEARS GIFT" | 1997.01.17. 14:54:59 |
| "POST CARD" | 1997.01.17. 14:54:59 |
| "LOTTERY" | 1997.01.17. 14:54:59, 1997.01.17. 14:55:23 |
| . | . |
| . | . |
| . | . |

OPERATION OF CALCULATING THE MINIMUM TIME INTERVAL

FIG.7

EXAMPLE OF OUTPUT RESULT OF
THE MINIMUM TIME INTERVAL COMPUTATION UNIT 22

| USER ID:1234 | | |
|---|---|---|
| KEY WORD 1 | KEY WORD 2 | MINIMUM TIME INTERVAL (SECONDS) |
| "NEW YEARS CARD" | "NEW YEARS GIFT" | 27 |
| "NEW YEARS CARD" | "POST CARD" | 27 |
| "NEW YEARS CARD" | "LOTTERY" | 0 |
| "NEW YEARS GIFT" | "POST CARD" | 0 |
| "NEW YEARS GIFT" | "LOTTERY" | 0 |
| "POST CARD" | "LOTTERY" | 0 |
| ⋮ | ⋮ | ⋮ |

FIG.9 DEGREE OF ASSOCIATION BETWEEN KEY WORDS (INDIVIDUAL USER)

USER ID:1234

| KEY WORD 1 | KEY WORD 2 | DEGREE OF ASSOCIATION |
|---|---|---|
| "NEW YEARS CARD" | "NEW YEARS GIFT" | 1 |
| "NEW YEARS CARD" | "POST CARD" | 1 |
| "NEW YEARS CARD" | "LOTTERY" | 2 |
| "NEW YEARS GIFT" | "POST CARD" | 2 |
| "NEW YEARS GIFT" | "LOTTERY" | 2 |
| "POST CARD" | "LOTTERY" | 2 |
| . | . | . |
| . | . | . |
| . | . | . |

FIG.10 DEGREE OF ASSOCIATION BETWEEN KEY WORDS (ADDING RESULT OF ALL USERS)

| KEY WORD 1 | KEY WORD 2 | DEGREE OF ASSOCIATION |
|---|---|---|
| "NEW YEARS CARD" | "NEW YEARS GIFT" | 15.89 |
| "NEW YEARS CARD" | "POST CARD" | 2.38 |
| "NEW YEARS CARD" | "LOTTERY" | 8.25 |
| "NEW YEARS GIFT" | "POST CARD" | 2.11 |
| "NEW YEARS GIFT" | "LOTTERY" | 5.94 |
| "POST CARD" | "LOTTERY" | 3.99 |
| . | . | . |
| . | . | . |
| . | . | . |

FIG.11

SEARCH RECORD

T=12:12:26   U=yvgXgzMfii8AAD7D   O="SOCCER"+"WORLD CUP"

T=12:12:51   U=hUIJBTM3QrIAAFST   O="NEIGHBORHOOD"

T=12:13:07   U=ytxsITL4TLgAAB4y   O="WORLD CUP"+"ELIMINATION MATCH"

T=12:13:53   U=hc1QJjM3QvAAAFY1   O="UNIVERSITY"

T=12:13:57   U=yvghgjM3QvUAAAFZT   O="BADGE TEST"

T=12:14:15   U=ytsR6zM3QwcAAFbw   O="CHERRY BLOSSOM"+"FLOWERING INFORMATION"

SEARCH RECORD FOR EACH USER

| USER ID:yvgXgzMfi18AAD7D ||
|---|---|
| SEARCH TIME | QUERY |
| 12:08:28 | "WORLD CUP" |
| 12:10:50 | "SOCCER" |
| 12:12:26 | "SOCCER" + "WORLD CUP" |
| ⋮ | ⋮ |

FIG.13

DEGREE OF ASSOCIATION BETWEEN KEY WORDS

| | | |
|---|---|---|
| "PC" | "USED" | 213.863 |
| "MIDI" | "ANIMATION" | 153.846 |
| "BASIC" | "VISUAL" | 136.000 |
| "HOTEL" | "OSAKA" | 121.000 |
| "HORSE RACE" | "PREDICTIONS" | 120.000 |
| "FREE" | "NO COST" | 116.000 |
| "IDOL" | "IMAGE" | 113.000 |
| "SOCCER" | "WORLD CUP" | 112.079 |
| "GAME" | "DOWNLOAD" | 110.783 |
| "IDOL" | "PICTURE" | 110.175 |
| "FRIEND" | "MAIL" | 101.954 |
| "HOTEL" | "TOKYO" | 100.992 |
| "RENTAL" | "REAL ESTATE" | 99.767 |
| "PC" | "MAIL-ORDER" | 98.000 |
| ⋮ | ⋮ | ⋮ |

IC2: INFORMATION ASSOCIATING APPARATUS

EXAMPLE OF OUTPUT RESULT OF THE TIME
AND USER SPECIFIC ADDING APPARATUS 40

| SEARCH DATE:1997.01.17 | |
|---|---|
| USER ID | QUERY |
| 1234 | "NEW YEARS CARD"<br><br>"NEW YEARS GIFT" AND "POST CARD" AND "LOTTERY"<br><br>"NEW YEARS CARD" AND "LOTTERY" |
| 1478 | "NEW YEARS CARD" AND "LOTTERY NUMBER" |
| ⋮ | ⋮ |

FIG.17

EXAMPLE OF OUTPUT RESULT OF
THE QUERY PARSING UNIT 50

SEARCH DATE:1997.01.17

| USER ID | QUERY |
|---|---|
| 1234 | "NEW YEARS CARD" "NEW YEARS GIFT" "POST CARD" "LOTTERY"··· |
| 1478 | "NEW YEARS CARD" "LOTTERY NUMBER"··· |
| ⋮ | ⋮ |

FIG.18

EXAMPLE OF OUTPUT RESULT OF
THE KEY WORD ADDING UNIT 60

SEARCH DATE:1997.01.17

| KEY WORD | NUMBER OF USES |
|---|---|
| "NEW YEARS CARD" | 84 |
| "NEW YEARS GIFT" | 35 |
| "POST CARD" | 13 |
| "LOTTERY" | 19 |
| "LOTTERY NUMBER" | 72 |
| ⋮ | ⋮ |

FIG.19 OPERATION OF CALCULATING THE CORRELATION R BETWEEN KEY WORD 1 AND KEY WORD 2

FIG.20

COEFFICIENT OF CORRELATION BETWEEN
KEY WORD 1 AND KEY WORD 2

| KEY WORD 1 | KEY WORD 2 | COEFFICIENT OF CORRELATION R |
|---|---|---|
| "NEW YEARS CARD" | "NEW YEARS GIFT" | 0.953 |
| "NEW YEARS CARD" | "POST CARD" | 0.912 |
| "NEW YEARS CARD" | "LOTTERY" | 0.935 |
| "NEW YEARS GIFT" | "POST CARD" | 0.986 |
| "NEW YEARS GIFT" | "LOTTERY" | 0.961 |
| "POST CARD" | "LOTTERY" | 0.947 |
| ⋮ | ⋮ | ⋮ |

FIG.21

COEFFICIENT OF CORRELATION BETWEEN
KEY WORD 1 AND KEY WORD 2

| KEY WORD 1 | KEY WORD 2 | COEFFICIENT OF CORRELATION R |
|---|---|---|
| "TRAFFIC INFORMATION" | "ROAD INFORMATION" | 0.961207728222820 |
| "NEW YEARS GIFT" | "NEW YEARS CARD" | 0.961182051222325 |
| "NEW YEARS POST CARD" | "NEW YEARS CARD" | 0.952555995585591 |
| "TRAFFIC INFORMATION" | "ROAD TRAFFIC INFORMATION" | 0.952515372273694 |
| "ROAD TRAFFIC INFORMATION" | "ROAD INFORMATION" | 0.951023931147218 |
| "GATEWAY" | "IAN" | 0.949365707744602 |
| "RANKING" | "LIBRARY" | 0.947280130026478 |
| "NEW YEARS GIFT" | "NEW YEARS POST CARD" | 0.938282880027105 |
| "HOTEL" | "MAP" | 0.938200090209231 |
| "LOTTERY NUMBER" | "NEW YEARS CARD" | 0.936025304450252 |
| "LOTTERY NUMBER" | "NEW YEARS POST CARD" | 0.933496063655810 |
| ... | ... | ... |

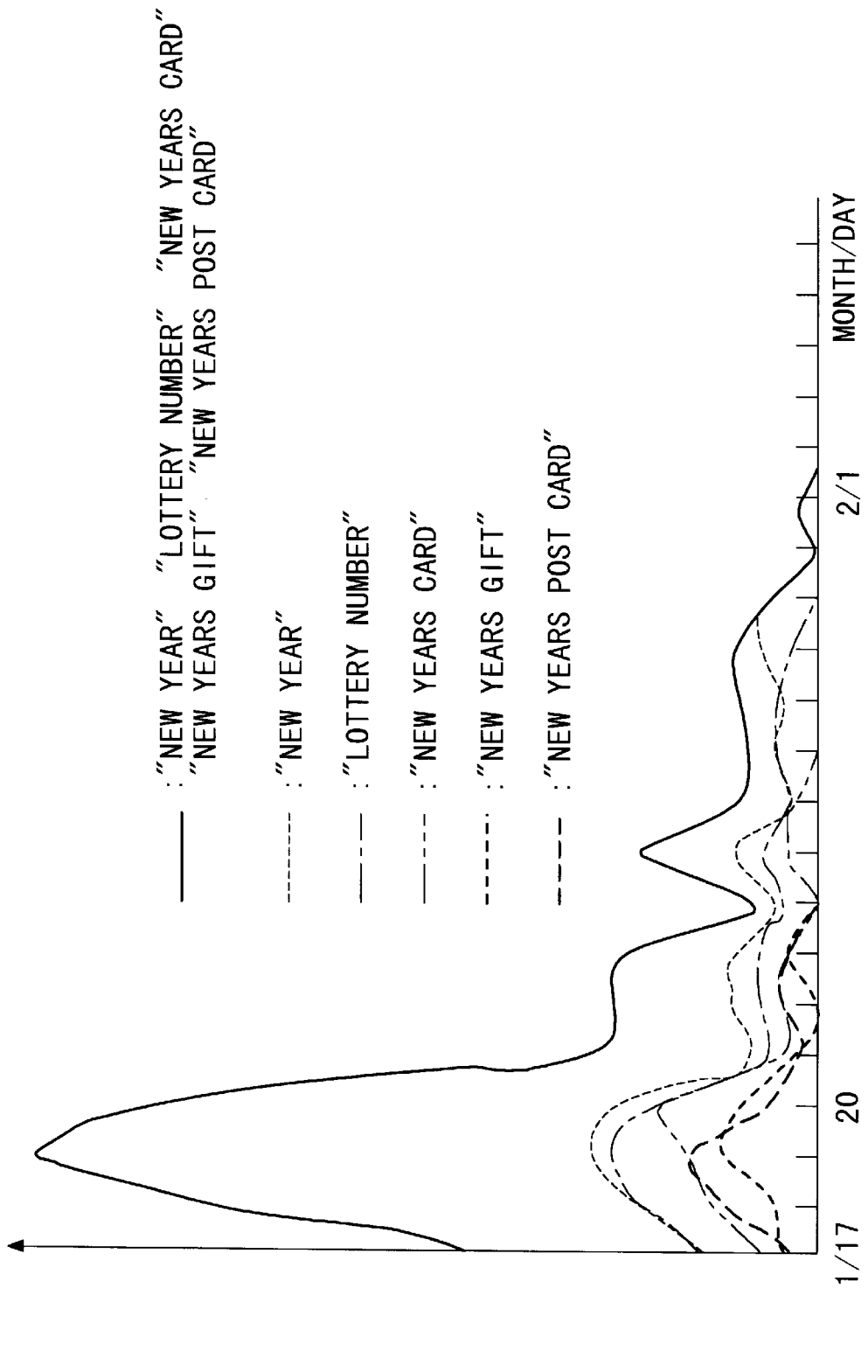

FIG.27

| ASSOCIATED WORD \ WORD | W1 | W2 | W3 | W4 | ... |
|---|---|---|---|---|---|
| W1 | | Ir (1, 2) | Ir (1, 3) | Ir (1, 4) | |
| W2 | Ir (2, 1) | | Ir (2, 3) | Ir (2, 4) | |
| W3 | Ir (3, 1) | Ir (3, 2) | | Ir (3, 4) | |
| ... | | | | | |

FIG.28

| ASSOCIATED WORD \ WORD | W1 | W2 | W3 | W4 | ... |
|---|---|---|---|---|---|
| W1 | | Cr (1, 2) | Cr (1, 3) | Cr (1, 4) | |
| W2 | Cr (2, 1) | | Cr (2, 3) | Cr (2, 4) | |
| W3 | Cr (3, 1) | Cr (3, 2) | | Cr (3, 4) | |
| ... | | | | | |

FIG.31

| GROUP NUMBER | KEY WORD | DEGREE OF ASSOCIATION |
|---|---|---|
| 1 | $W_3, W_5, W_6, W_7 \cdots$ | $\alpha_1$ |
| 2 | $W_1, W_4, W_8 \cdots$ | $\alpha_2$ |
| 3 | $W_2, W_9 \cdots$ | $\alpha_3$ |
| ⋮ | ⋮ | ⋮ |

INFORMATION ASSOCIATING APPARATUS AND METHOD

BACKGROUND OF THE INVENTION

1. Field of the Invention

The present invention relates to an apparatus and method for calculating the degree of mutual association between a plurality of key words used when carrying out a search, and associating each of the key words to the other.

This application is based on patent application No. Hei 9-148519 filed in Japan, the content of which is incorporated herein by reference.

2. Description of the Related Art

Information searching is a technology wherein, after documents have been accumulated in a database, the documents related to a query—an expression of information needs—given by the user are extracted from this database. A query is either a single key word or an expression including several key words, for example, "communication AND computer" or "communication OR computer". In the latter case, the query specifies extraction of documents related to both the key words "communication" and "computer", or to at least one of key words "communication" and "computer". Here, "a document related to a word" means that when a certain word in a certain document is given in advance as a keyword, the document matches the key word, or that when the keyword is included in a document, the document matches the key word. A document is a data object, usually textual, though it may also contain other types of data such as pictures, photographs, movies and so on.

Here, in information searching, if we could ascertain which information is commonly desired by many people, this could be reflected in information collection planning, and in providing an effective information search service by making this information accessible by menu selection.

However, each user may use different key words when searching for identical information because different users may see the same bit of information based on mutually differing unique viewpoints. Therefore, accurately grasping what information is commonly desired by users is impossible simply by adding the use frequency of a key word together.

However, if one can find out the strength of the association degree between words used in a predetermined time interval, words having a strong association with each other can be treated as key words used for obtaining identical information, and therefore, we can find the strength of the association degree of requested information accumulated in a database, based, for example, on the key word.

In this case, conventionally, in an associated word dictionary, such as thesauri, the relationship between one key word and another key word is statically defined, and if this associated word dictionary is used, the relationship between the key words can be obtained, and therefore, it is possible to find the strength of the association of the requested information accumulated on the database, etc.

However, in the above-described associated word dictionary, neither current neologisms such as individual product names and abbreviations, nor the association between key words the user treats as "associated" at the time of the search, that is, "an association between key words whose connections become strong temporarily" can be treated. For example, because "New Years Card" and "Lottery Number" in the New Years season are frequently used in searching for "the lottery numbers of New Years cards", it is desirable to compile these in one group as an identical information request, and in contrast should not compile these in one group outside the New Years season. "Soccer" and "World Cup", or "Ski" and "Hokkaido" would not be compiled in one group, in the same way as above.

That is, conventionally, because key words requesting identical information cannot be compiled in appropriate groups, it is impossible to appropriately calculate the association degree between key words, and therefore, the problem arises that it is difficult to accurately grasp what information many users desire.

SUMMARY OF THE INVENTION

The object of the present invention is an information associating apparatus and method which can accurately and easily grasp what information is desired by many users.

In order to achieve this object, the present invention provides an information associating apparatus and method which compiles for at least each search user queries and employs these queries used in a past predetermined time interval from accumulated query data used to search for information from the database, and, extracts the necessary parameters in order to calculate the association degree between key words used in the query extracted for each user, and calculates the association degree between key words using the calculated parameters.

By finding the association degree between key words, the effect is obtained of being able to find association degrees between key words that have a strong association temporarily, as well as being able to accurately and simply grasp what information is desired by many users.

In addition, the present invention provides an information associating apparatus and method which uses an association degree dictionary which supplies the association degree between key words in the query used in order to search the database in a past predetermined time interval, generates an initial group from grouping key words stored in said association degree dictionary according to the association degree, and uses the association degree between key words which are stored in said initial groups and said association degree dictionary, and generates groups of key words associated by sequentially making the groups satisfying predetermined conditions into one group.

By grouping the key words using the association degree, the effects can be obtained that it is possible to find the association degree of key words which are strongly associated temporarily, and to be able to understand easily and accurately what information is desired by many users.

BRIEF DESCRIPTION OF THE DRAWINGS

FIG. 5 shows an example of the output results of the query parsing unit 21.

FIG. 7 shows the output result of the minimum time interval computation unit 22 of the above embodiment.

FIG. 9 shows an example of the output results of the (user-specific) association degree that is output by the minimum time interval computation unit 22 shown in FIG. 7 based on the graph of the minimum time interval vs. association degree shown in FIG. 8.

FIG. 10 is the totaling of the association degree of two key words shown in FIG. 9 for all users, and shows the association degree (result of totaling for all users) between key words found by adding up for each user the association degree between two key words.

FIG. 11 shows an example of a search record in the above embodiment.

FIG. 12 shows the totaled search record for each individual user in the above embodiment.

FIG. 13 shows an example of the results of totaling the association degree between key words for all users by totaling of the association degree between key words based on the relation between the minimum time interval vs. association degree between key words.

FIG. 17 shows an example of the output results of the query parsing unit 50 in the information associating apparatus IC2.

FIG. 18 shows an example of the output results of the key word adding unit 60 in the information associating apparatus IC2.

FIG. 20 shows an example of the coefficient of correlation between the key word 1 and key word 2 in the information associating apparatus IC2.

FIG. 21 shows the results of finding the coefficient of correlation between respective key words after compiling a search record for each day and each user in the information associating apparatus IC2 for two weeks.

FIG. 22 shows the graph of the number of uses of each key word based on a two-week search record in the information associating apparatus IC2.

FIG. 27 shows an example of the construction of the interval association degree dictionary.

FIG. 28 shows an example of the construction of the coefficient of correlation association degree dictionary.

FIG. 31 shows an example of the construction of the group dictionary.

DESCRIPTION OF THE PREFERRED EMBODIMENTS

Figure 24:
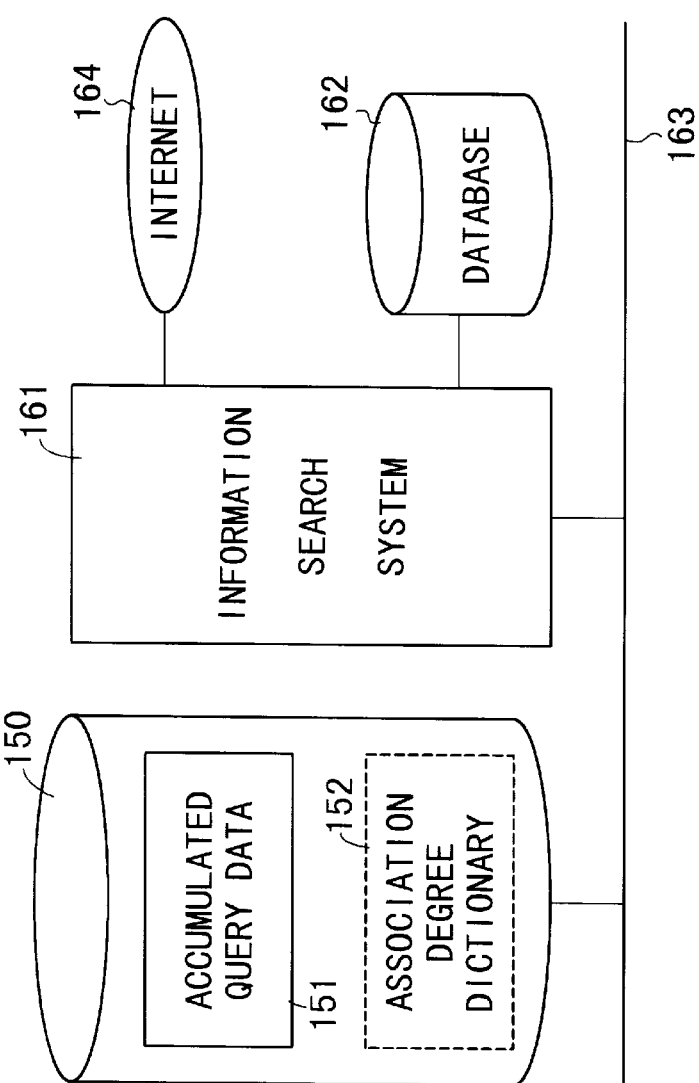
FIG. 24 shows an example of the common construction of the information associating apparatus of the first and second embodiment.

FIG. 24 shows the construction of an information associating apparatus common to the first and second embodiments explained below.

In FIG. 24, reference number 100 is the information associating apparatus furnished with the association degree dictionary generation unit 110. It generates the association degree dictionary 152 by using the accumulated query data 151 of the memory apparatus 150 in the disk server.

Here, the accumulated query data 151 accumulates queries sent to the information control system 161 from a user searching for information in the database 162 controlled by the information search system 161 or on the internet 164. In addition, in the accumulated query data 151, information related to users requesting searches by queries and the time of the search request (including year, month, and day) are associated with the query. Moreover, generally, users access the information search system 161 via a network 163 or the internet 164.

In addition, the association degree dictionary generation unit 110 is constructed from a query extraction unit 111, a preprocessing unit 112, and an association degree calculation unit 113. Here, the query calculation unit 111 carries out the processing for compiling the queries, at least for each search user, using the queries used during a past predetermined time interval from among the accumulated query data 151 which accumulates queries used in order to search for desired information in the database 162 or on an internet server 164. In addition, a preprocessing unit 112 carries out processing which calculates the parameters necessary for calculating the association degree of key words included in the query extracted for each search user by the user-specific extraction unit.

In this manner, by extracting and processing queries used for searches in a past predetermined time interval, it is possible to deal with associations between key words treated as "associated" by the user at the time of the search, for example, current neologisms such as product names and abbreviations.

The association degree calculation unit 113 carries out processing which calculates the association degree of each key word by using the parameter calculated by the preprocessing unit 112.

In addition, by compiling and processing for at least each search user the extracted queries, the association degree between key words can be accurately obtained based on each user's unique point of view.

Moreover, the functions of the association degree dictionary generation unit 110 furnished with a query extraction unit 111, a preprocessing unit 112, and an association degree calculation unit 113, whether realized with dedicated hardware or by being provided as a program, can be realized by processing using memory or CPU not shown in the information associating apparatus 100.

In FIG. 24, an example is shown wherein the information associating apparatus 100, the memory apparatus 150 in the disk server, and the information search system 161 are connected by a network 163, but it is not limited to this arrangement. The information associating apparatus 100 can also be built into a memory apparatus 150 which also serves as a disk server. Also, the function of the information associating apparatus 100 can be realized as one part of an information search system 161. Furthermore, in view of the reciprocal usage of the information search system 161 and the information associating apparatus 100, explained in detail separately, it is preferred that they be connected in a network. However, if the form is such that the accumulated query data 151 accumulated in the information search system 161 can be used by the information associating apparatus 100, it is not necessary that the information search system 161 and the information associating apparatus 100 should be connected.

Below, the information associating apparatus 100 shown in FIG. 14 and the information associating method are explained in detail in the first and the second embodiment.

[First Embodiment]

Figures 1, 2:
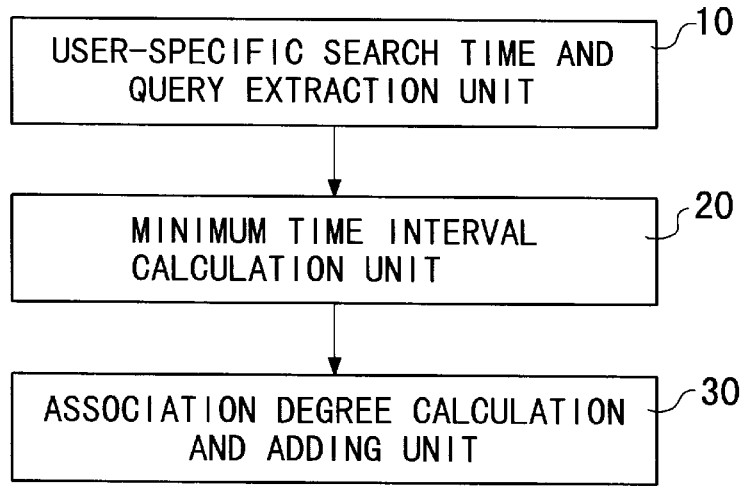
FIG. 1 is a block diagram showing the information associating apparatus IC1 in the first embodiment of the present invention.
FIG. 2 shows an example of the search record input into the IC1 information associating apparatus.

FIG. 1 shows a block diagram of the information association apparatus IC1 of the first embodiment of the present invention.

Information association apparatus ICI is an information search system which searches for desired information using a predetermined query, and calculates an association degree between the two key words according to the minimum time interval among the time intervals in which two key words are used.

In addition, the information association unit IC1 has a user-specific search time and key word extraction unit 10, a minimum time interval calculator 20, and an association degree calculation and adding unit 30.

The user-specific search time and key word extraction unit 10 is a unit for extracting search time and the above-mentioned query for each search user from data comprising searches carried out within a past predetermined time period.

The minimum time interval calculation unit 20 is a unit for calculating for each user the minimum time intervals having the lowest values among the intervals between the time that one query among queries extracted by the above-mentioned user-specific search time and key word extraction unit 10 is used, and the time that another query among the above-mentioned queries is used.

The association degree calculating and adding unit 30 is a unit for calculating for each of the search users the association degree between above-mentioned one query and the above-mentioned other query according to the above-described minimum time interval of the time these queries were used, and for adding the above-mentioned association degree calculated for the above-mentioned search users together.

Here, when explaining the correspondences with the information association apparatus 100 shown in FIG. 24, the user-specific search time and query extraction unit 10 corresponds to the query extraction unit 111, and the minimum time interval calculation unit 20 corresponds to the preprocessing unit 112. In addition, the association degree calculation and adding unit 30 corresponds to the association degree calculation unit 113.

In addition, in the data used in the user-specific search time and key word extraction unit 10, the "past predetermined time interval" is the time interval in which the number of the necessary queries were collected. As an example, it could be the time interval in which a million queries which can be validly statistically processed, were collected.

FIG. 2 shows an example of the search record input into the information associating apparatus IC1.

As a search record, the search time interval, the ID of the user who carried out the search, and the query are recorded. For example, in the first line of FIG. 2, the user with user ID 1234 carried out a search with a query for "New Years Card" on Jan. 17, 1998, at 14:54:32 PM.

Figures 3, 4:
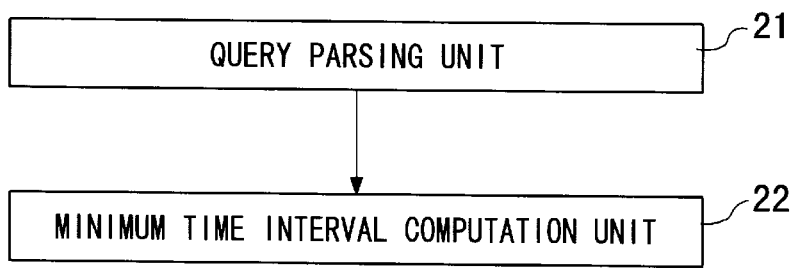
FIG. 3 shows an example of the output results of the user-specific search time and query extraction unit 10 in the above embodiment.
FIG. 4 is a block diagram of an example of the minimum time interval calculation unit 20 of the above embodiment.

FIG. 3 shows an example of the output results from user-specific search time and key word extraction unit 10 in the above embodiment.

The user-specific search time and key word extraction unit 10 is a unit for compiling the search record shown in FIG. 2 for each user, and in FIG. 3, the query used when the user with user ID 1234 made a search is shown along with its search time.

FIG. 4 is a block diagram showing an example of the minimum time interval calculation unit 20.

The minimum time interval calculation unit 20 has a query parsing unit 21 and a minimum time interval computation unit 22. The query parsing unit 21 parses each query into individual key words, and outputs the key words and the time they were used. The minimum time interval calculation unit 20 parses the second line in FIG. 3, ["New Years Gift" AND "post card" AND "lottery"], for example, into "New Years Card", "post card", and "lottery", and outputs each of these parsed key words and the search time, in this case, Jan. 17, 1998 at 14:54:59 PM.

FIG. 5 shows an example of the output results of the query parsing unit 21.

The minimum time interval computation unit 22 computes the time intervals $D_{12}1, D_{12}2, D_{12}3, \ldots$ which are the differences between the time of use of one key word 1 and the time of use of another key word 2, and finds the minimum time interval among these time intervals $D_{12}1$, $D_{12}2$, and $D_{12}3$. In addition, the minimum time interval computation unit 22 computes the time intervals $D_{23}1, D_{23}2$, and $D_{23}3$, which are the differences between the time of use of one key word 2 and the time of use of another key word 3, and finds the minimum time interval among these time intervals $D_{23}1, D_{23}2$, and $D_{23}3$, and finds the minimum time interval between two different key words below in the same manner.

In FIG. 5, because the key word "New Years Card" was used on Jan. 17, 1998 at 14:54:32 PM and 14:55:23 PM, and the key word "lottery" was used on Jan. 17, 1998, at 14:54:59 PM and 14:55:23 PM, the minimum time interval between the key word "New Years Card" and the key word "lottery" was "0 seconds".

Figure 6:
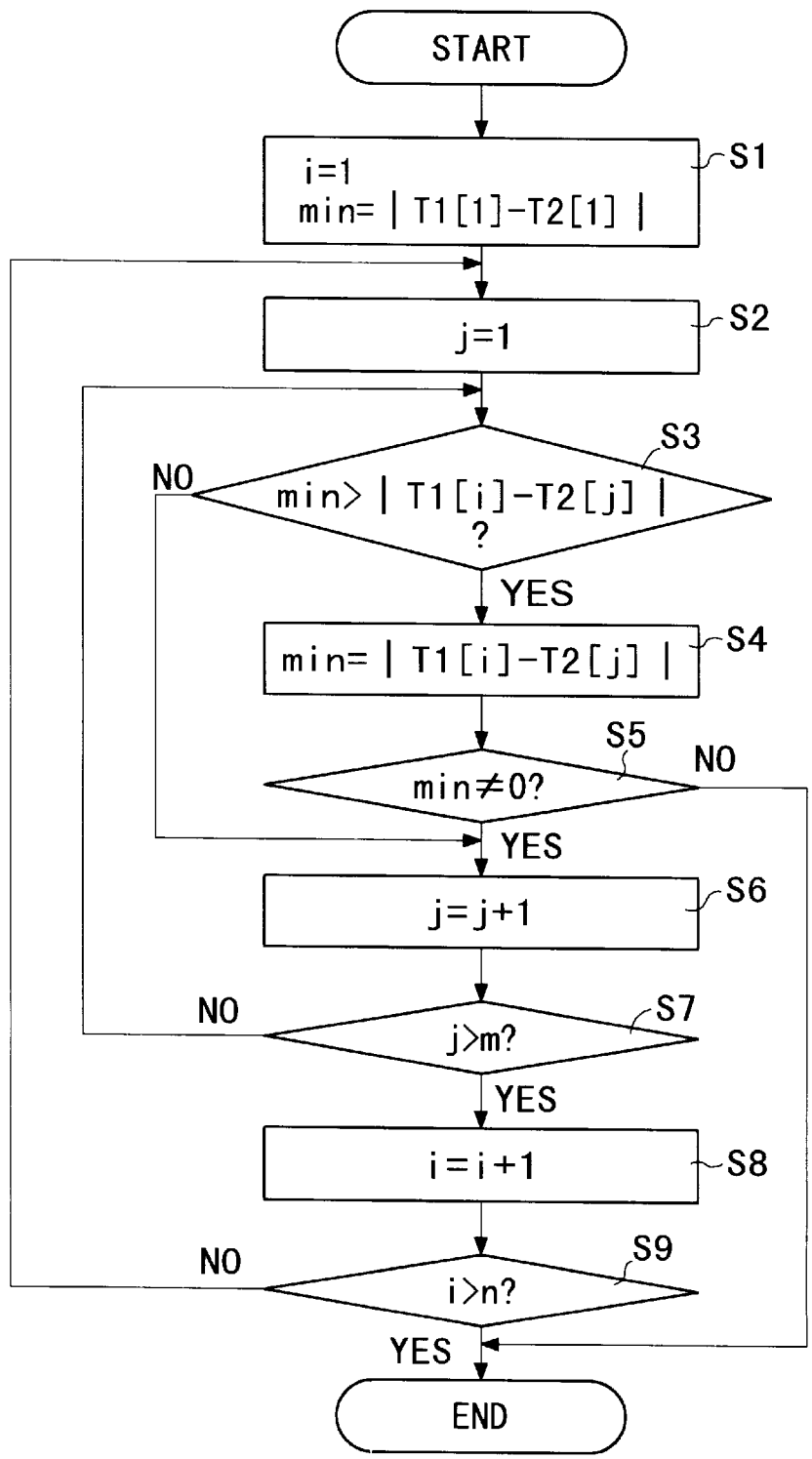
FIG. 6 is a flowchart showing the operation of calculating the minimum time interval between the time of use of key word 1, and the time of use of key word 2.

FIG. 6 is a flowchart showing the operation of finding the minimum time interval between the time of use of key word 1 and the time of use of key word 2.

Here, key word 1 was used n times, and its times of use are T1 [1], T1 [2], ..., T1 [n]; key word 2 was used m times, and its times of use are T2 [1], T2 [2], . . . , T2 [m]; and among the differences T1 [i] and T2 [D], the smallest value is found (S 2~S 9 ). Moreover, the absolute value of "T1 [1]–T2 [1]" as the initial value of the smallest value, and the absolute value of this "T1 [1]–T2 [1]" is stored in the variable min (S 1); this absolute value of the stored "T1 [1]–T2 [1]" is compared with the absolute value of "T1 [i]–T2 [j]"; and the smaller value is stored in the variable min based on the result of this comparison (S 2~S 4). However, if the variable min=0 (S 5), the calculation of the comparison is terminated.

FIG. 7 shows an example of the output results of the minimum time interval computation unit 22.

Figure 8:
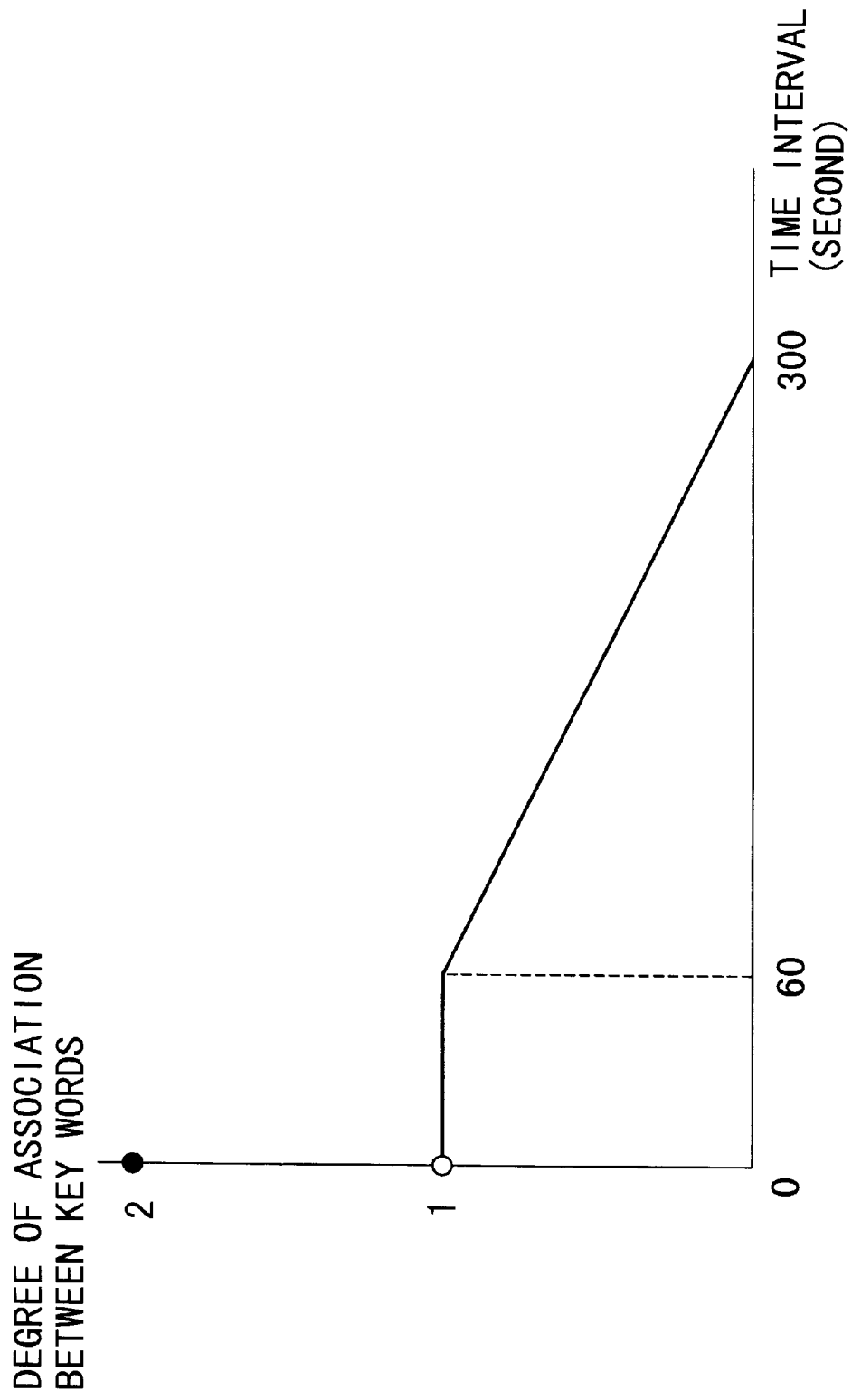
FIG. 8 is a graph for finding the association degree between key words based on the minimum time interval in the above embodiment.

FIG. 8 is a graph for calculating the association degree between key words based on the minimum time interval.

That is, after the minimum time interval between two key words is calculated based on this calculated minimum time interval, the association degree between these two key words is calculated by using the graph shown in FIG. 8.

In FIG. 8, if the minimum time interval between each key word is "0", the association degree between the key words is "2"; if the above-mentioned minimum time interval is more than 0 seconds and equal to or less than 60 seconds, the association degree between the key words is "1"; if the above-mentioned minimum time interval is more than 300 seconds, the association degree is "0"; and if the above-described minimum time interval is from 60 seconds to 300 seconds, the association degree between the above-mentioned key words is y. Here, the association degree y is found with the following linear function:

$$y=-x/240+1.25.$$

Moreover, x is the time interval (seconds) between the key words.

FIG. 9 shows the output results of the association degree (for a specific user) that is output by the minimum time interval computation unit 22 shown in FIG. 7 based on the graph of minimum time interval vs. association degree shown in FIG. 8.

FIG. 10 is the association degree between the two key words shown in FIG. 9 for all users added and totaled, and shows the association degree (the result of adding for all users) between key words found by adding for each user the association degree between two key words.

Next, the case of the application of the above embodiment to an actual search record is explained.

FIG. 11 shows an example of the search record in the above-described embodiment. Moreover, FIGS. 11~14 show the result of experiments actually carried out.

In FIG. 11, the search time, user ID, and query are shown for each search, and the search time, user ID, and query are shown by the character sequence continuing respectively as "T=", "U=", and "O=". In FIG. 11, for example, [T=12:12:26 U=yvgXgzMfiI8AAD7D O="soccer"+"World Cup"] shown in the first line means that at 12:12:26 PM user yvgXgzMfiI8AAD7D searched for information using the query "soccer+World Cup".

FIG. 12 shows for each user the totaled search record in the above-described embodiment.

According to FIG. 12, we understand that a search was carried out by user yvgXgzMfiI8AAD7D at 12:08:28 PM, 12:10:50 PM, and 12:12:26 PM.

FIG. 13 shows an example of the results of the association degree between key words for all users by calculating the association degree between key words based on the relation between the minimum time interval vs. the association degree between key words shown in FIG. 8.

Figure 14:
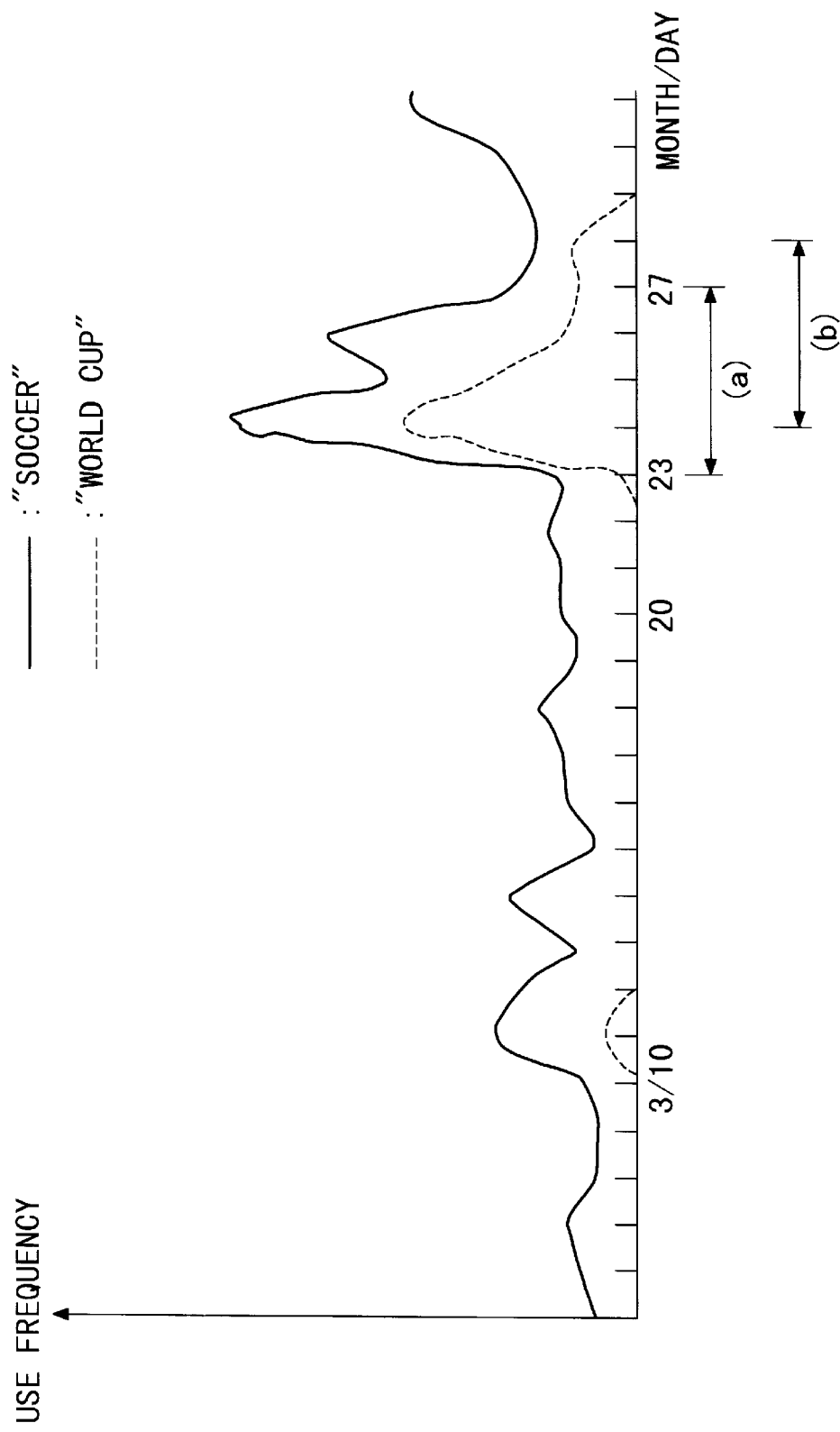
FIG. 14 shows the daily use frequency for the key word "soccer" and the key word "World Cup".

FIG. 14 shows for each day the frequency of use of the key word "soccer" and the key word "World Cup" by focusing on the key word "soccer" and the key word "World Cup" from among the association degrees of the key words in FIG. 13.

Information relating to "World Cup soccer" is determined to be desired by the user because the key word "soccer" was used intensively in period (a) in FIG. 14, and again in period (b) in FIG. 14, and "soccer" has a high association degree with "World Cup". In fact, the period (a) in FIG. 14 was the period during which the matches of the Japanese team were being played in the Asian preliminary matches, and the periods (a) and (b) almost completely agree.

According to the results in FIG. 14, by finding the association degree (the degree of the time interval association) between key words based on the minimum time interval as shown in the first embodiment, we understand that we can appropriately evaluate current neologisms such as new individual product names and abbreviations, and the association between key words that users "associate" at the time of the search, that is to say, "associations between key words that become strong temporarily".

In the above-described embodiment, as a method for calculating the association degree between key words based on the minimal time interval, the relation shown in FIG. 8 was used, but relationships other than that shown in FIG. 8 can be used if the calculation method defines the relationships between the minimal time interval and the association degree between key words. In addition, the minimum time interval between key words can be found by using flowcharts other than the flowchart shown in FIG. 6.

In the above-described embodiment, the query is parsed into key words, but when the query is composed of one key word, the query can be treated as a key word without parsing the query.

[Second Embodiment]

Figures 15, 16:
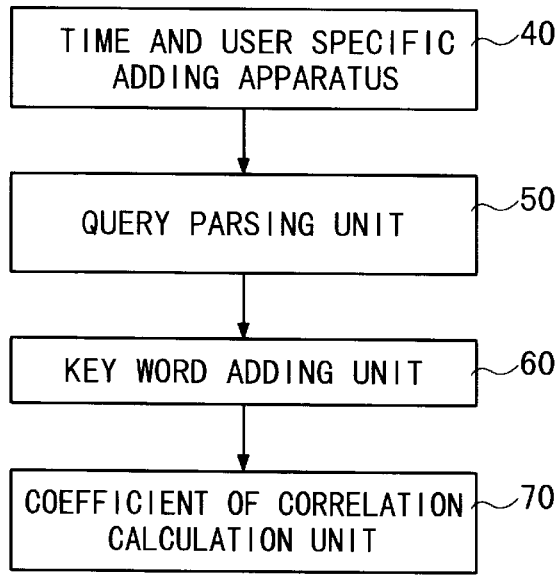
FIG. 15 is a block diagram of the information associating apparatus IC2 in the second embodiment of the present invention.
FIG. 16 shows an example of the output of the time-specific, user-specific query extraction unit 40.

FIG. 15 is a block diagram showing the information associating apparatus IC2 of another embodiment of the present invention.

The information associating apparatus IC2 is an information search system which searches for desired information using a query, and finds a coefficient of correlation between two key words according to the use frequency of the two key words. In addition, the information associating apparatus IC2 has a time-and-user-specific query extraction unit 40, a query parsing unit 50, a key word adding unit 60, and a coefficient of correlation calculation unit 70.

The time-and-user-specific query extraction unit 40 is a unit for compiling the search record shown in FIG. 2 by time and user. The information associating apparatus IC2 compiles the search record daily, and compiles the used queries every day for every user.

The query parsing unit 50 parses each query into each of its key words, and eliminates redundancies. For example, because the query ["New Years Card"] used by the user with user ID 1234 shown in FIG. 16 is a query consisting of one key word, the query is not parsed and consists of only the key word "New Years Card". The query ["New Years Gift" AND "post card" AND "lottery"] is parsed into "New Years Gift", "post card", and "lottery". The query ["New Years Card AND lottery"] is parsed into "New Years Card" and "lottery". The redundant key words among these are eliminated, resulting in four key words: "New Years Card", "New Years Gift", "post card", and "lottery".

The key word adding unit 60 is a unit for adding the use frequencies of every key word together every day. Among the key words used by the same user, key words used repeatedly are eliminated by the query parsing unit 50, so in the case that attention is focused on one key word, the number of the use frequency of the key word is the same as the number of the user that used the key word. That is to say, for example, if 10 users use the key word "New Years Card", the use frequency of the key word "New Years Card" is found to be 10. In other key words, even if one person among 10 uses the key word "New Years Card" 1000 times, for that one person, the use frequency of the key word is 1.

The coefficient of correlation calculation unit 70 finds the coefficient of correlation between two key words in respective time series based on the use frequency of the key word added daily.

Here, in explaining the correspondences with the information associating apparatus of FIG. 24, the time-and-user-specific query extraction unit 40 corresponds to the search extraction unit 111, and the query parsing unit 50 and the key word adding unit 60 correspond to the preprocessing unit 112. In addition, the coefficient of correlation calculation unit 70 corresponds to the association degree calculating unit 113.

In addition, in the time-and-user-specific query extraction unit 40, data in the searches performed in a "past predetermined time interval" is used, and this "past predetermined time interval" denotes the period corresponding to the period of the event (information need) for which the association degree should be found. Take, for example, as an event a large horse race that occurs every Sunday in a specific month. In addition, the name of the horse race on the first Sunday of the month is called "race A", the name of the horse race on the second Sunday is "race B", the name of the horse race on the third Sunday is "race C". In this case, it can be expected that the searcher uses the key word "horse race" and the key word "race A" as synonyms on or about the first Sunday, uses the key word "horse race" and the key word "race B" as synonyms on or about the second Sunday, and uses the key word "horse race" and the key word "race C" as synonyms on or about the third Sunday. In this example, the use frequency of the key word "horse race" becomes high every weekend, and the use frequency of each horse rice name becomes high on the weekend of that race. In this case, if the number of days for calculating the coefficient of correlation becomes high, it is not possible to obtain an accurate coefficient of correlation for them, but in contrast, if the number of days is too small, error is produced in the coefficient of correlation. That is, "the past predetermined time interval" is determined based, for example, on the periodicity of the information needs.

In addition, in the time-and-user-specific query extraction unit 40, time-wise extraction is carried out in the extraction of the data in the search carried out during the "past predetermined time interval", but this "time-wise" extraction denotes the time period in which the query is obtained from all user layers. For example, if there are two user layers, and one user layer searches information generally in the afternoon and the other user layer searches information generally in the evening, the "time-wise" interval is supposed to be one day.

FIG. 16. shows an example of the result of the output of the time-and-user-specific query extraction unit 40 in the information associating apparatus IC2.

FIG. 17 shows an example of the result of the output of the query parsing unit 50 in the information associating apparatus IC2.

FIG. 18 shows an example of the result of the output of the key word adding apparatus 60 in the information associating apparatus IC2.

Next, the operation of the information associating apparatus IC2 will be explained.

Figure 19:
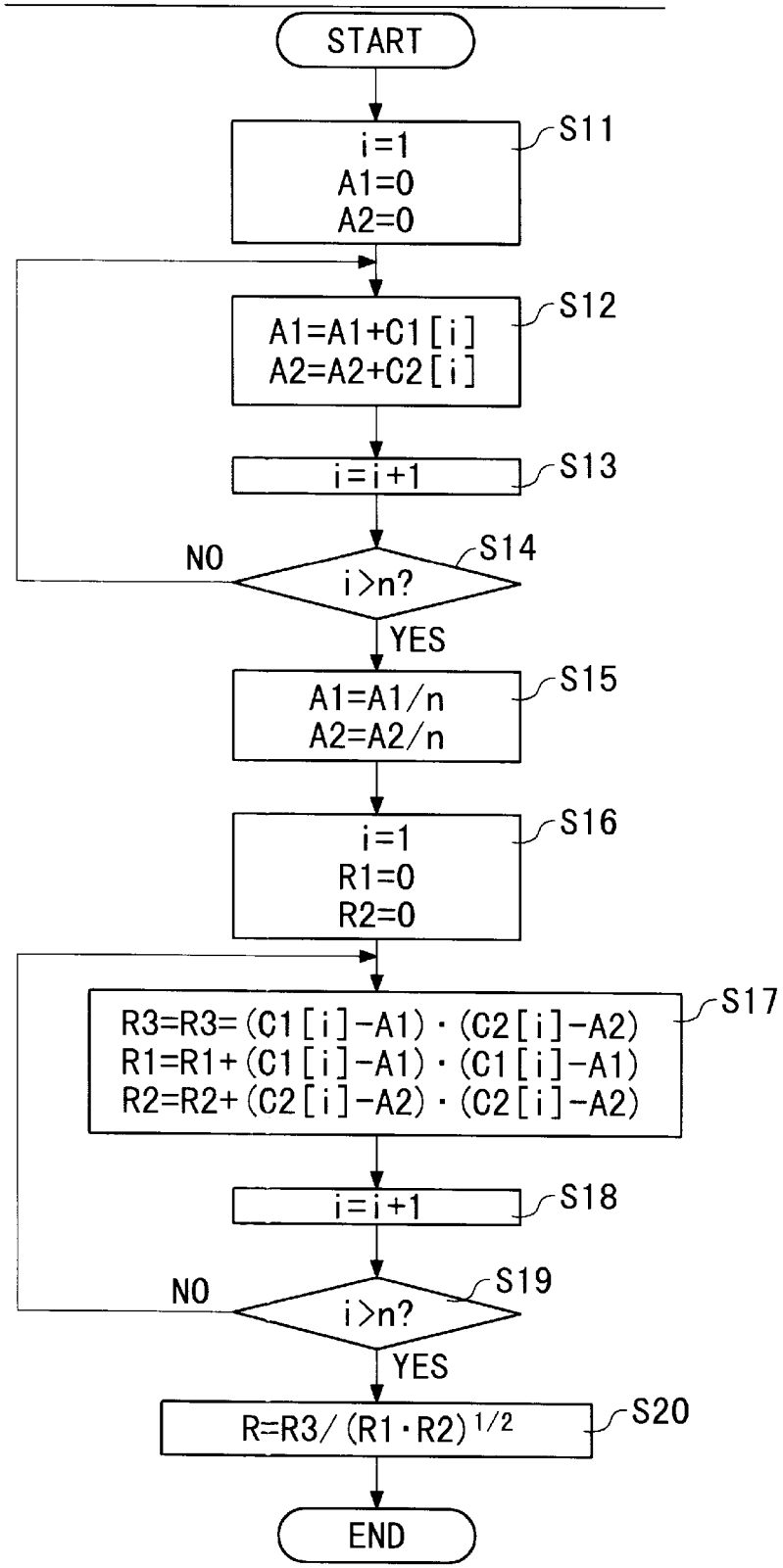
FIG. 19 is a flowchart showing the operation of calculating the coefficient of correlation R between the key word 1 and key word 2 in the information associating apparatus IC2.

FIG. 19 is a flowchart showing the operation of finding the coefficient of correlation R between key word 1 and key word 2 in the information associating apparatus IC2.

The term is n days, and for each day the number of uses of key word 1 is C1 [1], C1 [2], . . . , C1 [n], and the number of uses for key word 2 is C2 [1], C2 [2], . . . , C2 [n].

First, the average number of uses of key word A1 and the average number of uses of key word A2 are found (S 11~S 15). Here, the day is i, and in the case that the variables are R1 for key word 1 and R2 for key word 2 for calculating the coefficient of correlation R, i, variables R1 and R2 are initialized to i=1, variable R1=0, and variable R2=0 (S 16).

Next, the total sums of (C1 [i]–A1)·(C2 [i]–A2), (C1 [i]–A1)·(C1 [i]–A1), and (C2 [i]–A2)·(C2 [i]–A2) are found, and are, respectively, the variables R3, R1, and R2 (S 17~S 19). Finally, the coefficient of correlation R between key word 1 and key word 2 is calculated by $R3/(R1-R2)^{1/2}$.

FIG. 20 shows an example of the coefficient of correlation R between key word 1 and key word 2 in the information associating apparatus IC2.

Next, an operation in the case of applying the information association apparatus IC2 to an actual search record is explained.

FIG. 21 shows the result of finding the coefficient of correlation between respective key words after combining a two week search record for every day and every user in the information associating apparatus IC2.

Here, using FIG. 21 as an example, the explanation will be for the case in which two or more associated key words are grouped together.

In FIG. 21, because the coefficient of correlation between key words "New Years post card" and "New Years Card", the coefficient of correlation between "New Years Gift" and "New Years post card", the coefficient of correlation between the key words "lottery number" and "New Years Card", and the coefficient of correlation between the key words "lottery number" and "New Years post card" are high, it is possible to guess these key words are used when searching for information about the "lottery numbers of New Years Cards with a New Years Gift".

In addition, based on the fact that the coefficient of correlation between key words such as "road condition information", "traffic information", and "road condition traffic information" is high, it can easily be surmised what the information was that was actually strongly desired.

That is, simply by viewing the number of uses of individual key words as has been done conventionally, it is very difficult to surmise what kind of information was strongly desired, but by grouping together key words whose coefficient of correlation is above a predetermined threshold value and totaling their number of uses, it is easy to surmise what information was actually strongly desired.

The above-mentioned predetermined criterion for grouping key words is the following kind of criterion. First, among the coefficients of correlation calculated by the coefficient of correlation calculation unit 70, those coefficients of correlation equal to or above a predetermined value (for example, 0.93) are made designated coefficients of correlation. There are these designated coefficients of correlation, and if one of the key words (for example, "New Years Card") among the two key words ("New Years Gift" and "New Years Card") which correspond to one designated coefficient of correlation value (the coefficient of correlation in FIG. 21 is 0.96118215122325) is the same as the one key word ("New Years Card") which corresponds to the other above-mentioned coefficient of correlation value (in FIG. 21, the coefficient of correlation value 0.95255599585591), the two key words ("New Years Gift" and "New Years Card"), which correspond to the one above-mentioned coefficient of correlation, and the two key words ("New Years post card" and "New Years Card"), which correspond to the other above-mentioned designated coefficient of correlation, are put into one group. That is, according to the above-mentioned criterion, "New Years Gift", "New Years Card", and "New Years post card" are compiled into one group. In addition, according to the above-mentioned criterion, key words are compiled sequentially into one group one after another or in branches.

A key word collection means which puts key words in one group as described above can be also provided in the coefficient of correlation calculation unit 70 according to need. Moreover, when extracting N samples from two groups respectively and calculating the coefficient of correlation, the values of the coefficient of correlation for testing statistically whether the two original groups have a connection are placed on a chart that brings together the relationship between the three values of the number of samples (N), confidence level, and coefficient of correlation. Here, the predetermined value when the key words are grouped, in relation to the correlation between the two groups, can be made the coefficient of correlation which is statistically determined from the two values of:

A) the number of samples (N) when finding the correlation, and

B) the confidence level obtained with respect to the correlation.

Moreover, when determining, for example, whether there is a correlation with a 99% confidence level, the relation between the three values is such that as the sample points become larger the coefficient of correlation decreases, and contrariwise, as the sample points becomes smaller, the coefficient of correlation increases.

FIG. 22 is a figure graphically showing the number of uses of each key word based on the search record over a two week interval in the information associating apparatus IC2.

In FIG. 21, two key words which have a correlation R equal to or above, for example, 0.93 (this could also be equal to or above a value other than 0.93) are considered to be a key word used when requesting identical information. Additionally, according to this criterion, when a key word having a coefficient of correlation equal to or greater than 0.93 is selected from FIG. 21, the key words "New Years", "New Years card", "New Years post card", "New Years Gift", and "lottery number" are compiled into one group.

In FIG. 22, the change in the number of times that each key word is used and a change in the total (sum total) of the number of times each of the key words is used are shown together. In this way, simply by looking at the change in the number of uses of each key word, what kind of information is being strongly desired cannot be understood, but by looking at the change of the collected (totaled) number of uses of the key words, the degree of the demand of this desired information is conspicuously displayed, and that there was a high degree of demand for the information is easily comprehended.

Figure 23:
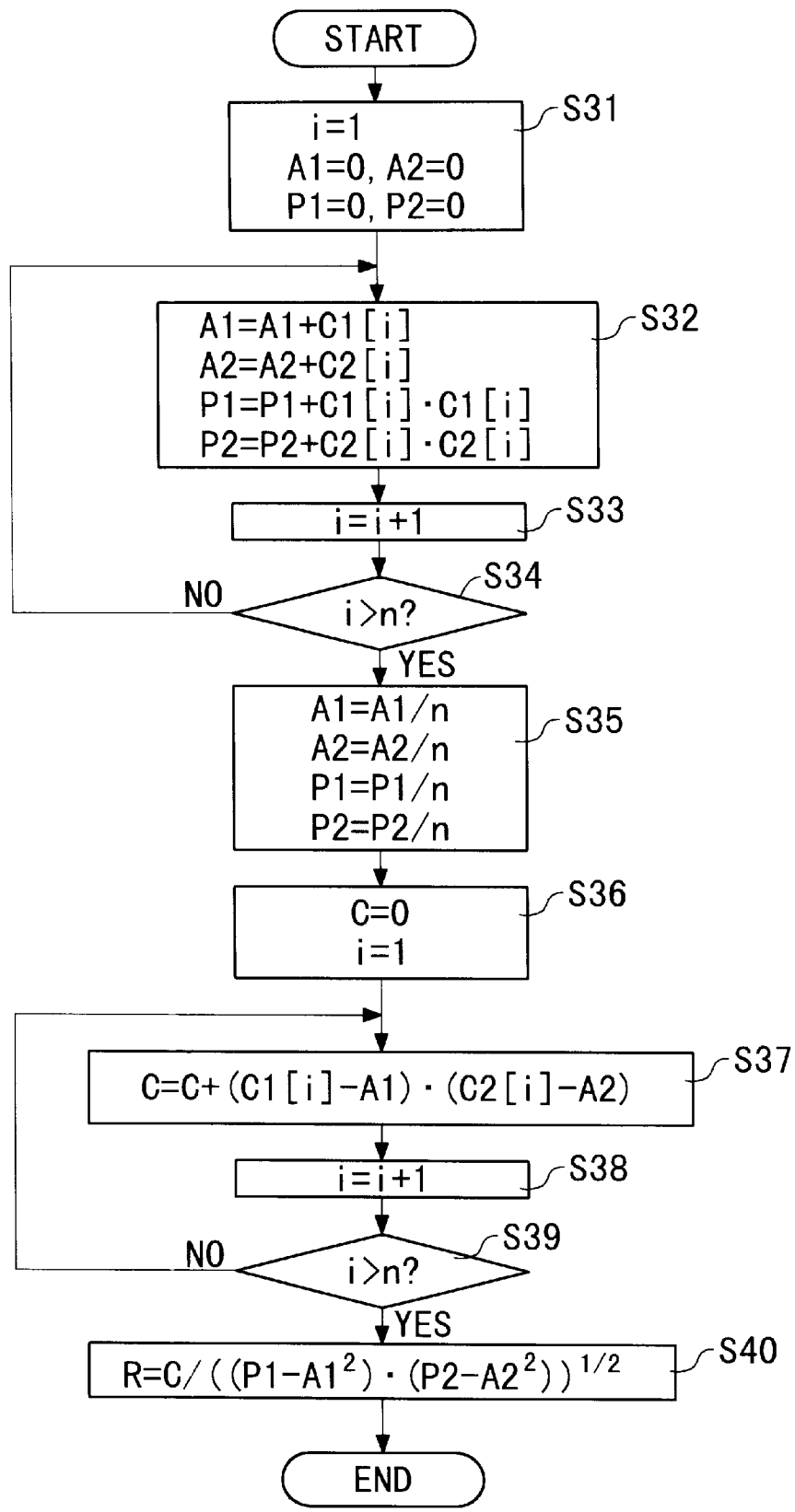
FIG. 23 is a flow chart showing the operation of calculating the coefficient of correlation R with $C/(V1 \cdot V2)^{1/2}$ by calculating the covariance C of C1 [i] and C2 [i] and the respective variance V1 and V2 in the information associating apparatus IC2.

FIG. 23 is a flowchart showing, in the information associating apparatus IC2, the operation of the covariance C of C1 [i] and C2 [i] and their respective variances V1 and V2, and finding the coefficient of correlation R by calculating $C/(V1 \cdot V2)^{1/2}$.

In this way, when finding the coefficient of correlation R, if the method of calculation is finding an ordinal series of coefficients of correlation, a flowchart other than the flowchart shown in FIG. 18, for example the flowchart shown in FIG. 23, can be used as well.

According to the above-described embodiment, because the association degree and the coefficient of correlation can be calculated based on the search record, it is possible to find the relations between key words reflecting the actual viewpoint of the users. In addition, because the association degree and the coefficient of correlation between the key words are limited to a certain particular period of time, when the use frequency in the particular period is higher or lower than usual, it is possible to find the cause. Furthermore, by grouping different key words used in requests for particular information, it is possible to accurately grasp the information requests during that period.

[Embodiment Three]

In the third through seventh embodiments, the information associating apparatus and method which groups words will be explained using one of or both the association interval degree which finds the association degree between key words based on the minimum time interval explained as in the first embodiment, and the degree of correlation which finds the association degree between key words as a coefficient of correlation explained as in the second embodiment.

Figure 25:
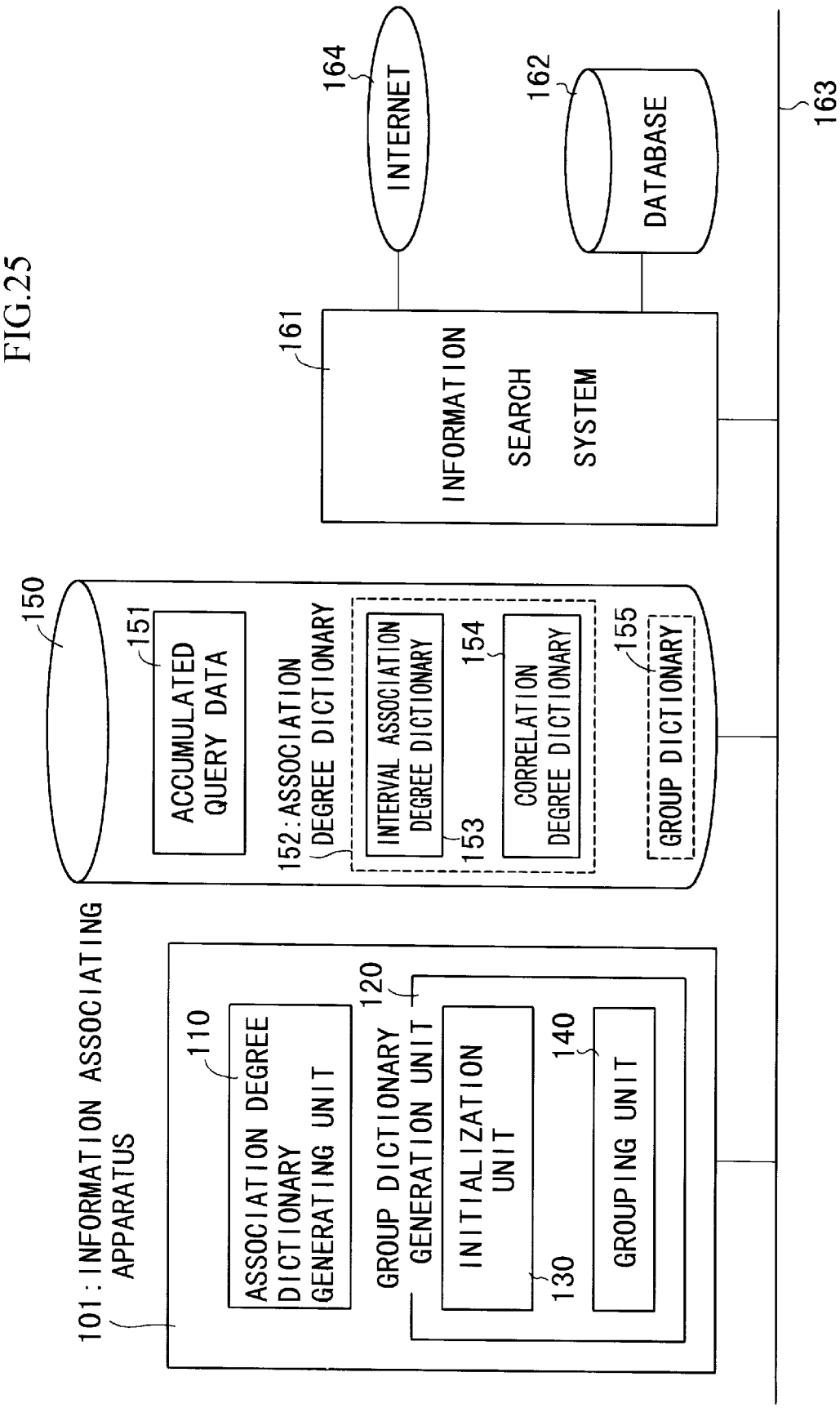
FIG. 25 shows an example of the construction of the information associating apparatus in the third through seventh embodiments.

FIG. 25 shows the information associating apparatus in the third through seventh embodiments. In the figures, reference number 101 is the information associating apparatus having a structure furnished with an association degree dictionary generating unit 110 and a group dictionary generating unit 120. The association degree dictionary 152 and the group dictionary 155 are generated using the accumulated query data 151 of the memory apparatus 150 built into the disk server. Moreover, in FIG. 25, parts corresponding with each part in FIG. 24 have identical reference numbers, and their explanation is omitted.

Here, the association degree dictionary generating unit 110 has a function of one of or both of each processing units shown in FIG. 1 and each. processing unit shown in FIG. 15, and generates an interval association degree dictionary 153 showing the association degree between key words as an association interval degree, or, the correlation degree dictionary 154 showing the association degree between key words as a degree of correlation, or, both dictionaries.

In addition, the group dictionary generation unit 120 is constructed from an initialization unit 130 and a grouping unit 131, and generates a group dictionary 155 using one or both of the interval association degree dictionary 153 or the correlation degree dictionary 154. It then processes the grouping of key words. Here, the initialization unit 120 carries out processing in which an initial group is generated for grouping key words stored in the association degree dictionary 152 according to the association degree between the key words. Additionally, the grouping unit 140 processes the grouping of associated key words by groups satisfying predetermined conditions being made into one group by using groups generated by the initialization unit 130 and the association degree between key words stored in the association degree dictionary 152.

Figure 26:
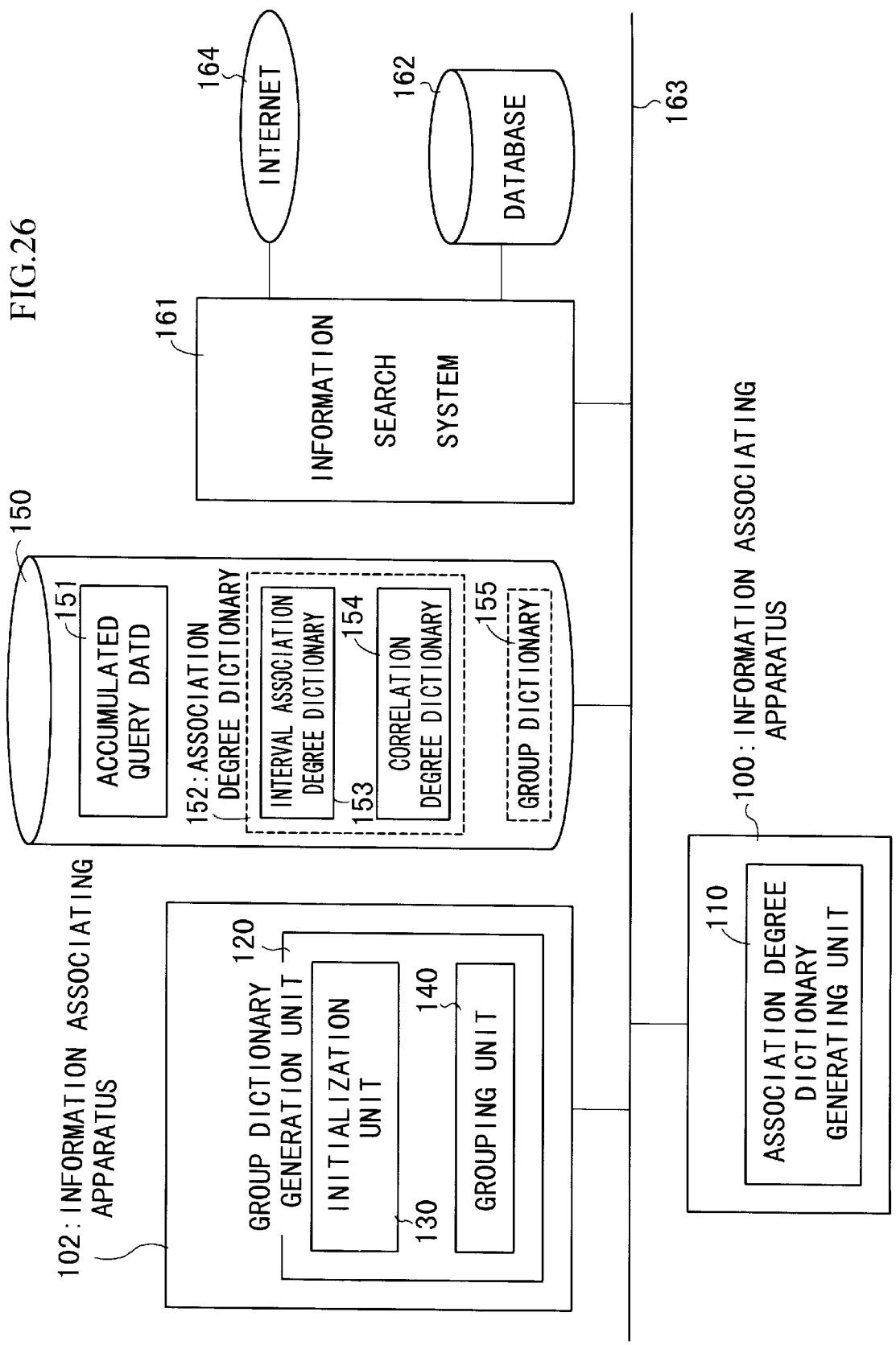
FIG. 26 shows an example of the construction of another information associating apparatuses in the third through seventh embodiments.

FIG. 26 shows another construction of the information associating apparatus 102 in the third through seventh embodiments. The difference between the information associating apparatus 102 shown in FIG. 26 and the information associating apparatus 101 shown in FIG. 25 is that as a construction, the former is not provided with an association degree dictionary generation unit 110. That is, the information associating apparatus 102 in FIG. 26 generates a group dictionary 155 using only the association degree dictionary 152 generated by the information associating apparatus 100 explained in FIG. 24. Moreover, in FIG. 26, the parts corresponding to each part in FIG. 24 and FIG. 25 have identical reference numbers, and their explanation is omitted.

The information associating apparatuses 101 and 102 shown in FIG. 25 and FIG. 26 accurately group key words which have become strongly but temporarily associated by grouping key words using the key word dictionary 152 that stores the association degree between key words that have temporarily become strongly associated.

Moreover, the association degree dictionary generation unit 110 and the group dictionary generation unit 120 shown in FIG. 25 and FIG. 26 can be realized by by dedicated hardware. They can also be realized by executing a program using memory and CPU (central processing unit) not shown in the information associating apparatuses 101 or 102.

In addition, in FIG. 25 and FIG. 26, the information associating apparatuses 101 and 102, the memory apparatus 150 in the disk server, and the information search system 161 are shown as being connected by a network 163, but they are not limited to this structure, and the information associating apparatuses 101 and 102 can also serve as a disk server, and be built into the memory apparatus 150. Additionally, in the information search system 161, the function of information associating apparatuses 101 and 102 can be realized as one part of its function. Furthermore, in view of the reciprocal use of the information search system 161 and the information associating apparatuses 101 and 102, it is preferable that they be connected by a network 163, but if the form is such that the accumulated query data 151 in the information search system 161 and the association degree dictionary 152 can be used by the information associating apparatus 101 or 102, it is not necessary that the information search system 161 and the information association apparatuses 101 and 102 should be connected.

FIG. 27 shows an example of the construction of the interval association dictionary, and FIG. 28 shows an example of the construction of the correlation degree dictionary. Moreover, in FIG. 27, the interval association degree of key word W1 and key words W2, W3, . . . , are respectively shown as Ir (1, 2), Ir (1, 3), . . . . In addition, there is the relation that Ir (j, k)=Ir (k, j) (j, k: 1≦j, k≦n, and j≠k, where n is the key word number) such that Ir (1, 2)=Ir (2, 1), Ir (1, 3)=Ir (3, 1), . . . . Similarly, in FIG. 28, the degree of correlation between key words is stored as Cr (j, k) (j, k: 1≦j, k≦n, and j≠k, where n is the key word number).

The explanation of the operation of the association degree dictionary generation unit 110 shown in FIG. 25 is the same as that of the first embodiment and the second embodiment, and is omitted. The group dictionary generation unit 120 of the information associating apparatuses 101 and 102 shown in FIG. 25 and FIG. 26 are explained in greater detail in the present embodiment and the forth embodiment through the seventh embodiment.

In the third embodiment, the case in which the group dictionary generation unit 120 generates the group dictionary 155 by using only one of either the interval association degree dictionary 153 or the correlation degree dictionary 154 is explained.

First, the operation of the initialization unit 130 in the group dictionary generation unit 120 will be explained. The initialization unit 130 sets the initialization value of the groups which include each key word.

Figure 29:
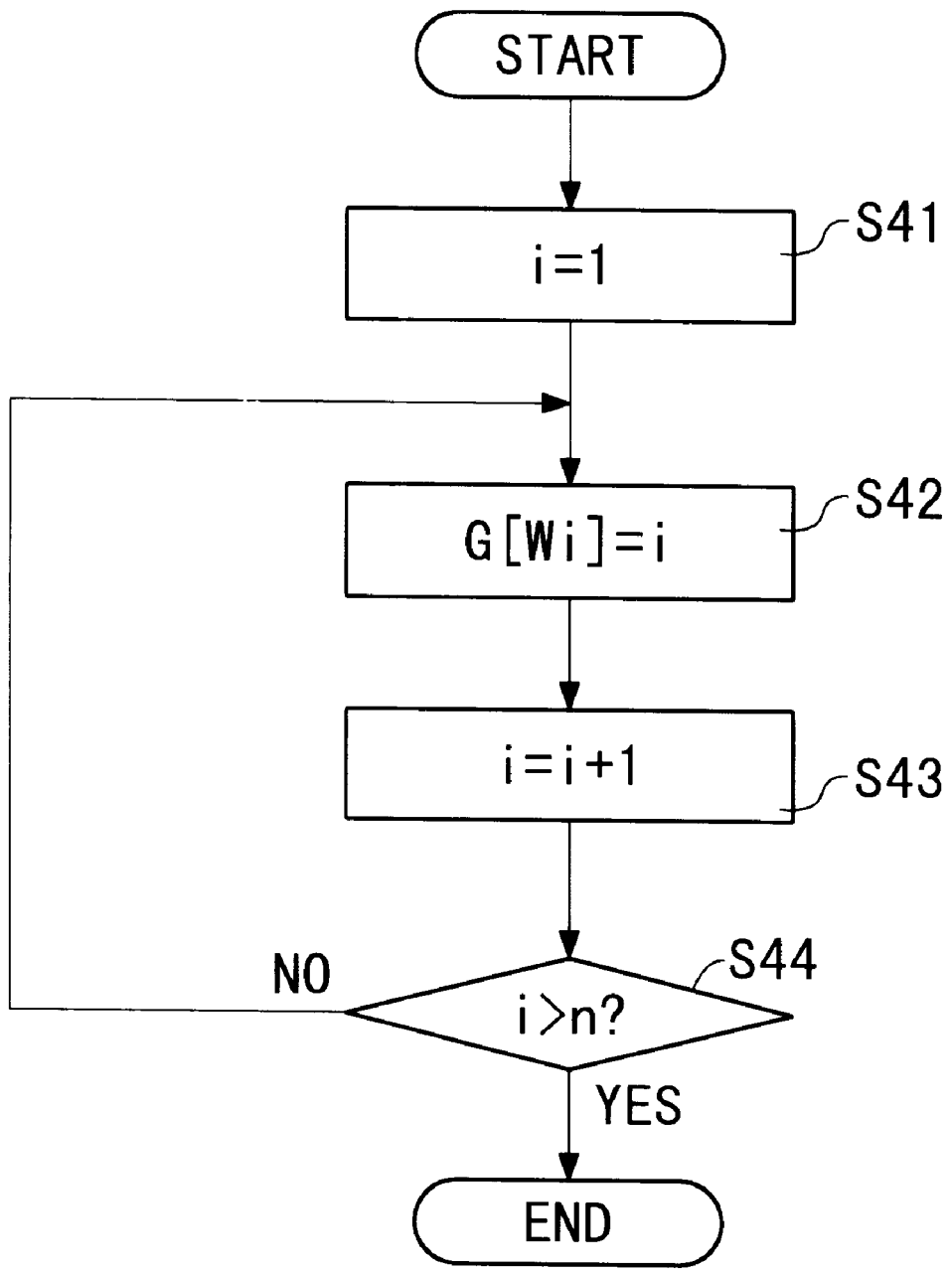
FIG. 29 is a flowchart showing the operation of initial group generation.

FIG. 29 is a flowchart showing an example of the operation of the initialization unit 130. In FIG. 29, G [Wi] is a buffer showing the name of the group which includes the key word Wi.

First, variable i is initialized (step S 41), the value i is substituted for G [Wi], and the variable i is incremented (step S 41~43). Next, the number n of the key word and the variable i are compared, and if variable i is larger than the number n of the key word, the processing is terminated, and if not, the processing returns to step S 42 (step S 44).

By the above processing, each key word is set so as to be included in a group comprising only one key word each.

As one example, a key word is grouped using the interval association degree dictionary 153 which stores the interval association degree between the key words shown in FIG. 10. In the interval association degree dictionary 153, if the items stored are W1="New Years Card", W2="New Years Gift", W3="post card", and W4="lottery", then by the initialization unit 130, each is initialized such that G ["New Years Card"]=1, G ["New Years Gift"]=2, G ["post card"]=3, and G ["lottery"]=4.

Figure 30:
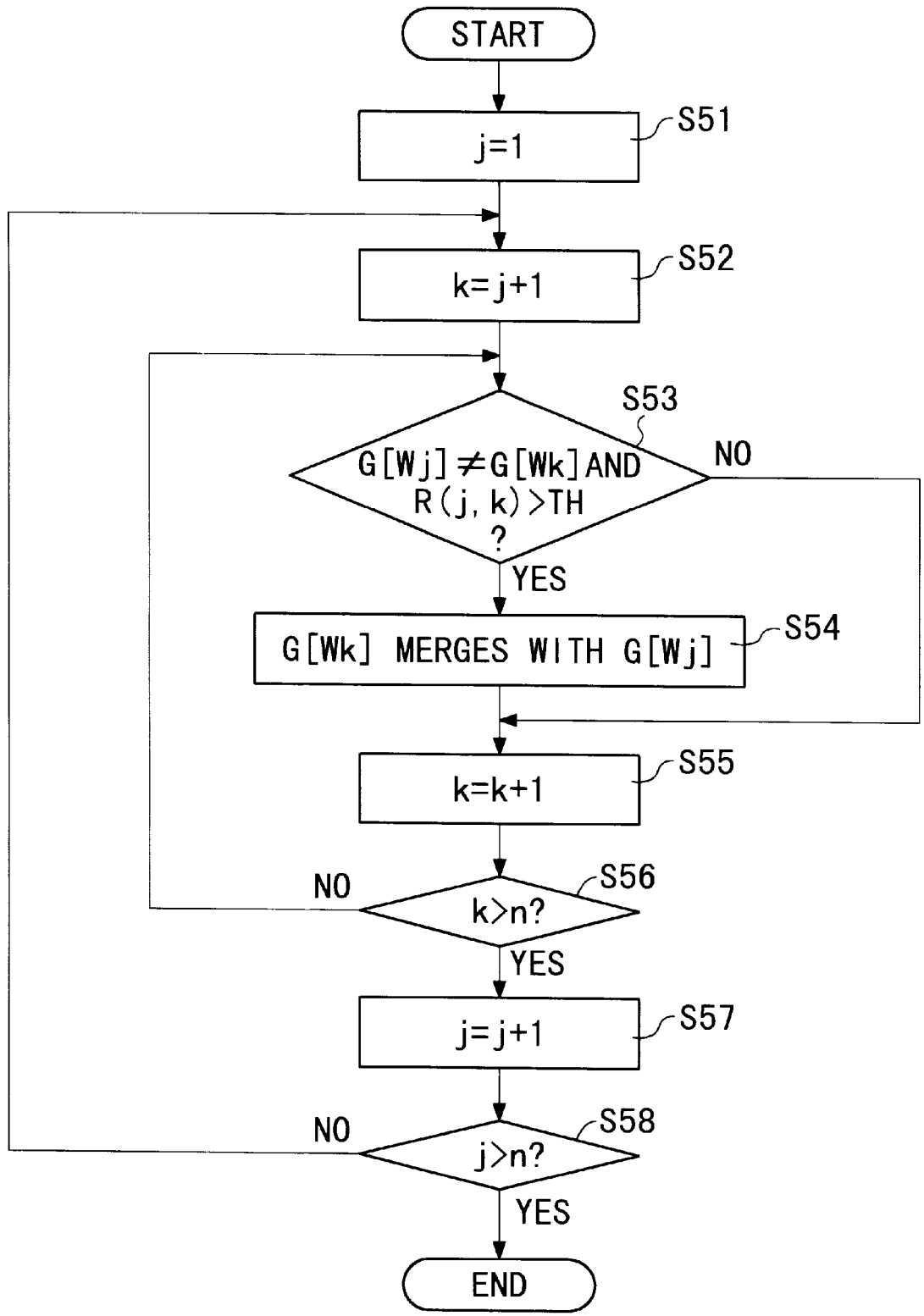
FIG. 30 is a flowchart showing the operation of the grouping unit when grouping using either the interval association degree dictionary or the coefficient of correlation association dictionary.

Next, the operation of the grouping unit 140 will be explained. The grouping unit 140 groups key words based on either the interval association degree or the degree of correlation between key words. FIG. 30 is a flowchart showing the operation of the grouping unit 140, and using this figure, the operation of the grouping unit 140 will be explained in detail below. In FIG. 30, the association degree which is the criterion for two key words Wj and Wk is R (j, k), and the threshold value when determining the grouping of the association degree R (j, k) is TH.

First, the numbers of the key words j and k are initialized (step S 51, 52).

Next, by determining whether the groups G [Wj] and G [Wk] are equal and whether R (j, k) exceeds the threshold value TH, it is determined whether the conditions for grouping are satisfied. Here, if the interval association degree apparatus dictionary 153 storing the interval association degree between the key words shown in the above-described FIG. 10 is used, then the association degree R (j, k) is the interval association degree Ir (j, k) as shown in FIG. 27. Here, if the threshold value is TH=5.00, then the key word W1 "New Years Card" and key word W2 "New Years Gift" have an association degree R (1, 2)=Ir (1, 2)=15.89, fulfilling the conditions for grouping. Moreover, when the interval association degree Ir is used as the association degree R, the threshold value TH is set comparatively large when it is desired that the key words be classified into finer groupings, and set comparatively small when it is desired that the key words be brought into large groupings. That is, the threshold value TH should be set according to the object of the grouping of the key words.

In step S 53, when the conditions are satisfied, processing is carried out to merge group G [Wk] with G [Wj]. Moreover, merging is carried out by renaming the merged group name by the name of the merging group. In the above example, because the group G ["New Years Card"] is "1", the group name of G ["New Years Gift"] is made "1". By doing this, the elements of G ["New Years Card"] are grouped as ("New Years Card", "New Years Gift").

Next, the number k of the key word is incremented, and compared with the key word number n (steps S 55, S 56). If the key word number k exceeds the key word number n, the key word number j is incremented, and compared with key word number n (steps S 57, 58).

In this manner, by merging into G [Wj] the group G [Wk] for all combinations of (j, k) for which the association degree R (j, k) exceeds the threshold value TH, irrespective of the order of selecting (j, k), the grouping of the key words can be carried out in a string one after the other or as branches.

Moreover, in the above-described example, the result is that the group names G ["New Years Gift"], G ["lottery"], G ["post card"] also become "1", and the elements of G ["New Years Gift"] are grouped as ("New Years Card", "New Years Gift", "lottery", "post card"). In this manner, by the processing shown in FIG. 30, key words are gathered together in one group as a string one after the other or as branches.

Moreover, the above-described example was explained using the interval association degree Ir as the association degree R, but similarly it is possible to use the degree of correlation Cr as the association degree. In this case, the threshold value can be set to the coefficient of correlation that is found for the above two values, the confidence with respect to the association of the two groups, and the sample points when finding the association.

In the above-described manner, it is possible to carry out grouping of key words in a string one after another or as branches using only the one of either the interval association degree or the correlation degree between key words. Additionally, by grouping using only one criterion, the processing of the grouping can be carried out in a short period of time.

FIG. 31 shows an example of the group dictionary 155 obtained from the above processing. In the example of FIG. 31, the group dictionary 155 includes the group number, the key words comprising the elements of the group, and the association degree in the group. Moreover, the association degree here is either the sum total or average of all the key words in the group. Also, the group numbers can be in descending order of the association degree of the groups.

[Embodiment Four]

As in Embodiment three, if the association degree between any key word in one of the groups and any key word in any other group exceed a threshold value, in the process of making them one group, there is the problem that key words which are not associated to each other may be entered into the same group. For example, when there are three key words W1, W2, and W3, and a high association degree between W1 and W2, and W2 and W3, in the above processing, these three key words would be put into one group. However, it is not necessarily the case that the association degree between W1 and W3 is high. In addition, because the grouping is carried out by only one of either the interval association degree or the correlation degree of the key words, key words whose connection has become temporarily strong may not be put into the same group.

In light of these problems, in embodiment four the case will be explained wherein the grouping generation unit 120 uses both the interval association degree and the correlation degree of key words, and in addition a group dictionary 155 is generated so that two key words with a low association degree will not be put into one group. Moreover, the structure of the apparatus is the same as that in the explanation of embodiment 3, so its explanation will be omitted. In addition, the operation of the initialization unit 130 in the present embodiment is that same as that in the explanation of embodiment three, so its explanation will be eliminated.

Figure 32:
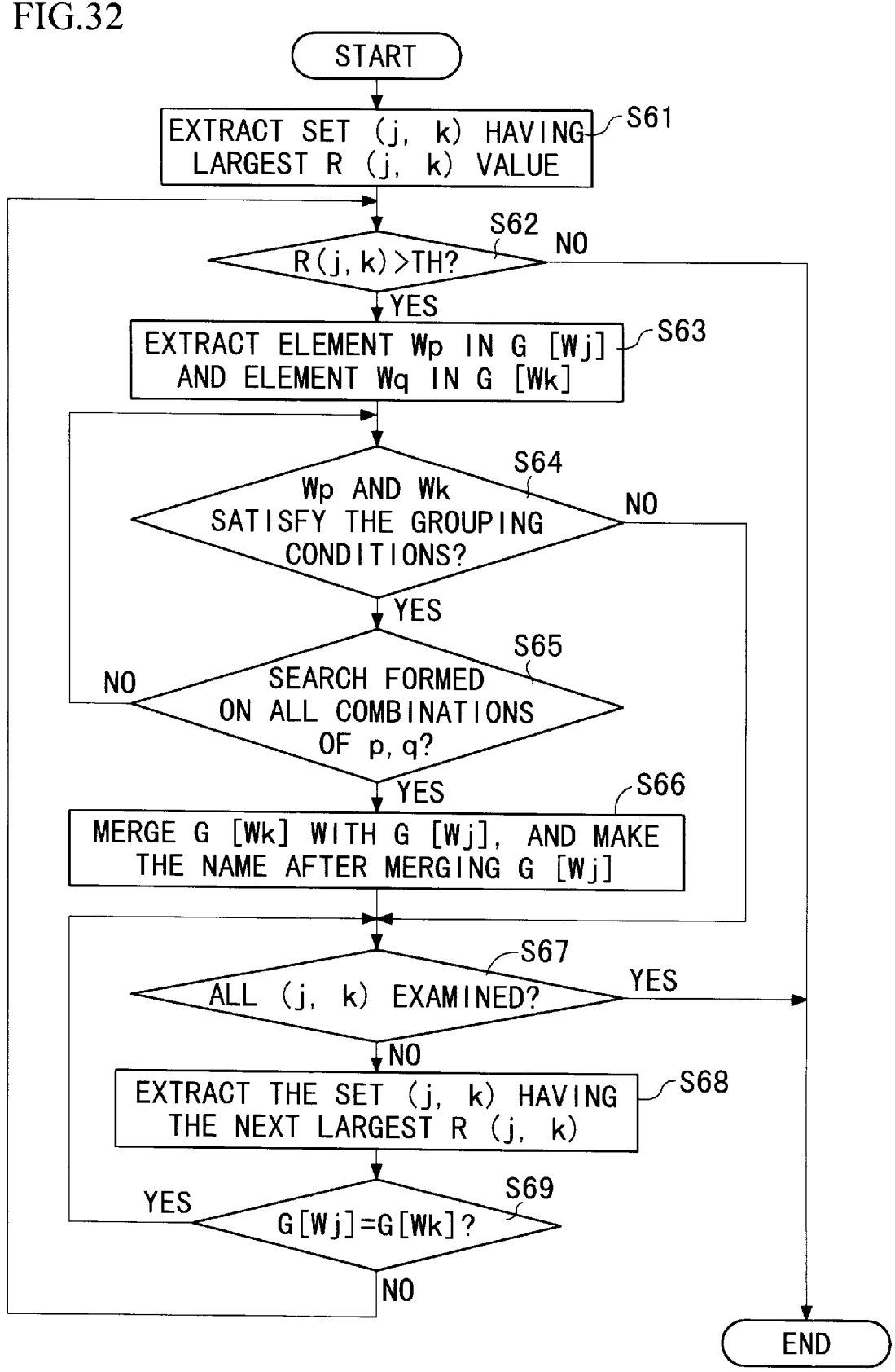
FIG. 32 is a flowchart showing the operation of generating the initial group by the initialization unit or showing the operation of generating the group by the grouping unit.

Below, the operation of the grouping unit 140 will be explained in detail using FIG. 32.

First, the set (j, k) in which the association degree R (j, k) is the largest is found (step S 61). Here, the interval association degree Ir is used as the association degree R. It is also possible to use the correlation degree Cr, but when the information about two search objects having no association is generated in the same period, the correlation degree Cr may become high even though there is no correlation between one of the key words used for obtaining the information about a search object and the other key word used for obtaining information about another search object. Here, it is preferable that the interval association degree Ir be used as the association degree R.

Next, the association degree R (j, k) selected in step S 61 is compared with the threshold value TH (step S 62). Moreover, when the interval association degree Ir is used as the association degree R, the threshold value TH is made comparatively large when the key words are to be put into small groups, and comparatively small when key words are to be put into large groups. That is, the threshold value should be set according to the aim of the grouping of the key words.

If the conditions in step S 62 are satisfied, the element Wp included in the group G [Wj] and the element Wq included in group G [Wk] are extracted (step S 63). In the first step, there is only a single element in each group, but as the grouping of the key words progresses, there are elements in each group.

It is determined whether the extracted elements Wp and Wq satisfy the grouping conditions (step S 64). Here the conditions used are:

interval association degree Ir (p, q)>THI 1, or correlation degree Cr (p, q)>THC 1.

Since the grouping conditions are satisfied if one of either or both of the conditions of the interval association degree or the correlation degree is satisfied, the determination of grouping can be performed with two different criteria, so omission of words that should be grouped together will occur rarely. Moreover, the threshold value THI 1 with respect to the interval association degree Ir is the same or smaller than the TH value used in step S 62. In addition, the THC1 value with respect to the correlation degree Cr sets the value of the coefficient of correlation obtained from two values: the confidence obtained for the association of two collections and the coefficient of correlation found from the two values of the sample point number when finding the association.

When the element Wp of group G [Wj] and the element Wq of G [Wk] is plural, it is determined whether processing of step S 64 has been carried out for all sets of p and q (step S 64), and if there are unprocessed elements, processing returns to step S 64.

On the one hand, when the conditions of step S 63 are satisfied by all sets of elements Wp and Wq, group G [Wj] and G [Wk] are merged into one group (step S 66). Moreover, merging occurs by the group name of merged group G [Wk] being renamed with the group name of the merging group W [Wj].

Next, for all sets (j, k) it is determined whether or not the threshold determination has been carried out (step S 67), and in the case that all have been determined, the processing of the grouping is terminated.

On the other hand, when determination has yet to be carried out, the set (j, k) having the next largest association degree R (j, k) among the association degrees determined in step S 62 is extracted (step S 68), and it is determined whether or not group G [Wj] and G [Wk] have already been merged (step S 69). Moreover, the determination of step S 69 can be carried out by the determination of whether the two group names are identical. In addition, when the conditions of step S 69 are not satisfied, the processing returns to step S 62, and a new group generation processing is carried out, and if not, processing returns to step S 67.

Grouping of key words is carried out according to the above processing.

Moreover, a group dictionary 155 such as that shown in FIG. 31 is generated by this processing, and the association degree of the groups, as a rule, is the total or average of the interval association degree between all key words in a group. Moreover, the association degree of groups can be the total or average of the degree of correlation between all the key words in a group, and can also be the total or average of a predetermined coefficient attached respectively to the interval association degree and the correlation degree between key words.

In the above manner, the grouping unit 140 can generate one group if, for the key words which are the object of comparison, the association degree between all key words in a group and all key words in another group is greater than the threshold value of its interval association degree, or if the value of the correlation degree is greater than its threshold value. In this manner, by using two criteria, key words whose linkage has become temporarily strong will be accurately grouped. In addition, by carrying out grouping only when the association degree between all key words in one group and all key words in another group satisfy the conditions, there will be no inclusion of key words in the same group whose association degree is low.

[Embodiment Five]

In embodiments 3 and 4, the initialization unit 130 generated groups, each of which include one key word for the initial groups. The present embodiment explains the case where using the interval association degree dictionary 153, the above-mentioned initialization unit 130 generates initial groups such that the degree of interval association Ir between key words included in each group is all larger than a predetermined threshold value, and an example of processing carried out in which key words with a particularly high association degree between each other are made an initial group.

Figure 33:
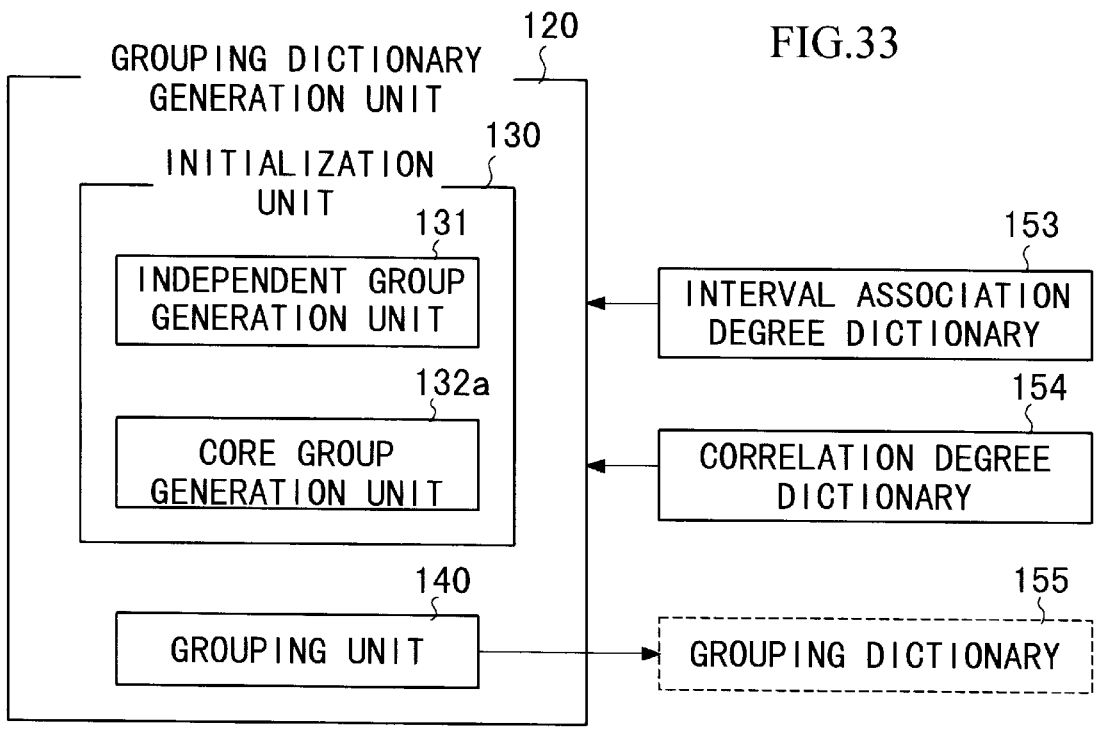
FIG. 33 shows the construction of the group dictionary generation unit in the fifth embodiment.

FIG. 33 shows the composition of a group dictionary generation unit 120 which differs from embodiment 3 and embodiment 4 in that the initialization unit 130 is constructed from an independent group generation unit 131 and a core group generation unit 132a, and processing is carried out in which key words with a particularly high association degree between each other are made an initial group. Below, the operation of this initialization unit 130 will be explained in detail.

Based on the processing shown in FIG. 29, the independent group generation unit 131 generates groups which each include one key word. Moreover, FIG. 29 is the same as that explained in embodiment 3, and its explanation will be omitted.

The core group generating unit 132a carries out the processing of making the initial groups which contain the key words with a high association degree using the groups generated by the independent group generation unit 131 and the interval association degree dictionary 154. This processing flow follows FIG. 32. However, the association degree R used in step S 62 is the interval association degree Ir, and the threshold value TH is THI2. Here, the threshold value THI2 is set at a value larger than the threshold value TH that the grouping unit 140 uses in step S 62. In addition, in the processing of the core group generation unit 132a, the condition for grouping in step S 62 is interval association degree Ir (p, q)>THI2.

That is, in addition to using only the interval association degree Ir, the conditions for grouping have the same threshold value as the threshold value THI2 that is used in step S 62. In this manner, the core group generation unit 132a uses a threshold value THI2 with a value larger than the threshold value TH of step S 62 in the processing of the grouping unit 140. Thus, it is possible to generate as initial groups key words with a particularly high degree of association between each other. Additionally, by carrying out grouping using key words with a particularly high association degree between each other as initial groups, the grouping of key words can be effectively carried out.

Moreover, the operation of the grouping unit 130 and the generated group dictionary 115 in the present embodiment is the same as that explained in embodiment 4, so its explanation is omitted here.

[Embodiment 6]

Using the interval association degree dictionary 153, the initialization unit 130 in embodiment 5 carries out processing in which key words with particularly high association degrees were made the initial groups. In the present embodiment, the process of calculating a value that is a different criterion calculated from the interval association degree dictionary 153, and of making initial groups that contain key words having a particularly high association degree using this value will be explained. Moreover, the apparatus construction is the same as that explained in embodiment 3, and the explanation of its operation has been omitted.

Figure 34:
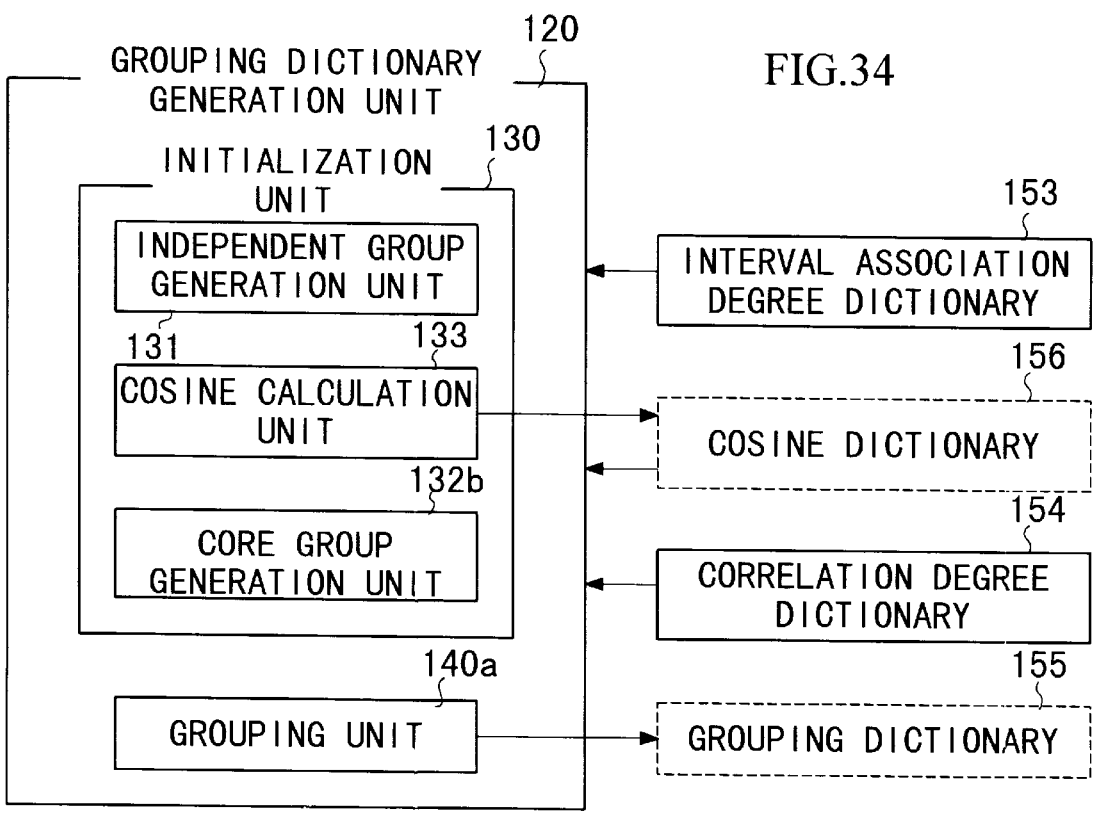
FIG. 34 shows the construction of the group dictionary generation unit in the sixth embodiment.

FIG. 34 shows the composition of the group dictionary generation unit 120 in the present embodiment. It differs from embodiment 5 in that the initialization unit 130 is further provided with a cosine calculation unit 133, and processing of the initialization unit 130 is carried out in which key words with a particularly high association degree between them are made initial groups using a value that the core group generation unit 132a calculates with the cosine calculation unit 133. Below, the operation of this initialization unit 130 will be explained in detail.

The independent group generation unit 131, based on the processing in FIG. 29, generates groups that include one key word each. Moreover, the explanation of FIG. 29 is the same as that in embodiment 3, so its explanation is eliminated here.

The cosine calculating unit 133 uses the interval association degree in the interval association degree dictionary 153 to generate a vector for each key word, and by calculating the cosine value between the vectors of two key words, calculates the cosine value between each key word. Here, the cosine calculation unit 133 generates the vector of key word Wj as an n-dimensional vector $$Wj=(Ir (j, 1), Ir (j, 2), \ldots, Ir (j, n)),$$

and generates the vector of key word Wk as an n-dimensional vector $$Wk=(Ir (k, 1), Ir (k, 2), \ldots, Ir (k, n)).$$

Moreover, the value n is the total number of the key words. In addition, in the interval association degree dictionary 153, the values of Ir (j, j) and Ir (k, k) are not included, but this value is set to "0" and a vector is generated.

In addition, the cosine calculation unit 133 finds the cosine cos (j, k) between each key word using the generated vector from:

$$\cos(j, k) = (Wj \cdot Wk)/(|Wj| \cdot |Wk|) =$$
$$\{Ir (j, 1) \cdot Ir (k, 1) + Ir (j, 2) \cdot Ir (k, 12 + \ldots + Ir (j, n) \cdot$$
$$Ir(k, n)\} / [\{Ir (j, 1)^2 + Ir (j, 2)^2 + \ldots + Ir (j, n)^2\}^{1/2} \cdot$$
$$\{Ir (k, 1)^2 + Ir (k, 2)^2 + \ldots + Ir (k, n)^2\}^{1/2}].$$

Moreover, j=1, 2, . . . ,n, k=1, 2, . . . ,n, and j≠k.

Here, because each interval association degree is a value equal to or greater than 0, the cosine value found by the cosine calculation unit 133 is a value between 0 and 1. That is, the higher the association between two key words, the larger the cosine value.

The above-described cosine calculation unit 133 finds the cosine between each key word, and generates a cosine dictionary 156.

The core group generation unit 132b uses the cosines between key words in the cosine dictionary calculated by the cosine calculation unit 133, and generates an initial group such that the cosine between the key words included in each group is larger than a predetermined threshold value. The flow of this processing is as shown in FIG. 32. However, the association degree R used in step S 62 is the cosine value, and the condition for grouping in step S 64 in the processing of the core group generation unit 132a is:

cos (p, q)>THCOS1.

Next, the operation of the grouping unit 140 in the present embodiment will be explained. This processing flow is shown in FIG. 32, and is the same as that explained in embodiment 4. However, the condition for grouping in step S 64 by the grouping unit 140 is:

Ir (p, q)>THI1, or

Cr (p, q)>THC1, or cos (p, q)>THCOS2.

Moreover, the threshold value THCOS1 used in the grouping of step S 64 in the processing of the core group generation unit 132a is set at a larger value than the threshold value THCOS2 used in the grouping unit 140. In this manner, in the core group generation unit 132b, using the cosine value, key words with particularly high association degrees with each other can be made initial groups.

Moreover, the group dictionary 155 is generated by processing such as that shown in FIG. 31, and the association degree of the groups, as a rule, is the total or average of the interval association degree between the key words in a group. Moreover, the association degree of the groups can be the total or average of the degree of correlation or the value of the cosine between all key words in a group, and furthermore, it could be the total or average of respective predetermined coefficients of the interval association degree, the correlation degree, or the value of the cosine between the key words.

As explained above, the core group generation unit 132b, by using the cosine value between the key words from the cosine calculation unit 133, and using a threshold value THCOS1 which is larger than the threshold value THCOS2 of step S 64 in the processing of the grouping unit 140, key words with a particularly high association degree between them can be generated as initial groups. In addition, by the grouping unit 140 grouping key words using initial groups with particularly high association degrees between them, it can group the key words efficiently.

Furthermore, the grouping unit 140 can accurately group associated key words by determining the grouping using three different criteria.

Moreover, in the present embodiment, the grouping unit 140 determined grouping by using the values of the three standard values in step S 64. In this manner, it is preferable to use many different standard values in determining grouping, but it is possible to use two arbitrary standard values among these three to determine grouping.

[Embodiment seven]

In embodiment 6, the initialization unit 130 is provided with a cosine calculation unit 133. However, here an example is explained in which the present embodiment provides a cosine calculation unit 133 in the grouping unit 140, the grouping unit 160 that generates the cosine dictionary, and carries out the grouping of key words using the interval association degree dictionary 153, the correlation degree dictionary 154, and the generated cosine dictionary 154. Moreover, the structure of the apparatus is the same as that in embodiment 3, and its explanation will be omitted. Its operation is explained as follows.

Figure 35:
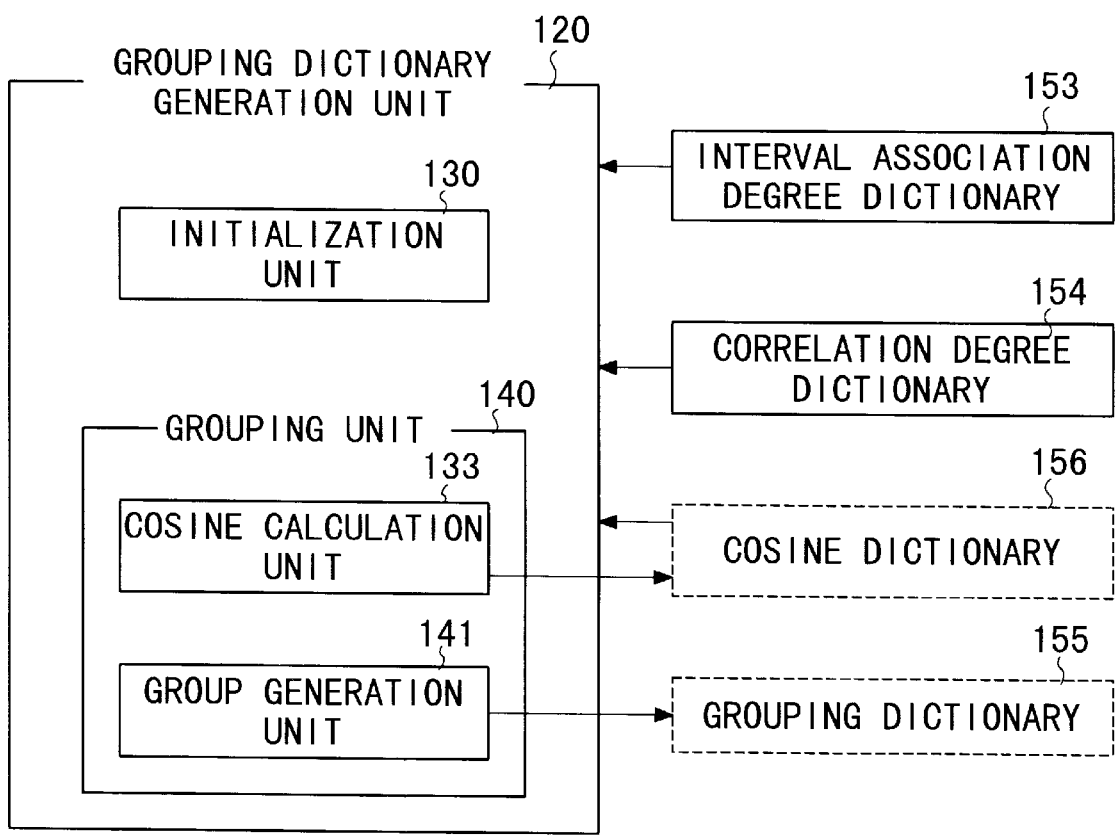
FIG. 35 shows the construction of the group dictionary generation unit in the seventh embodiment.

FIG. 35 shows the construction of the group dictionary generation unit 120 in the present embodiment. As shown in FIG. 35, the grouping unit 140 is furnished with a cosine calculation unit 133 and a grouping generation unit 141. Below, the operation of the group dictionary generation unit 120 will be explained in detail.

The initialization unit 130 generates the initial groups by the processing explained in embodiment 4. However, generation of initial groups by the processing explained in embodiment 5 is also possible. The details are the same as those in the explanations of embodiment 4 and embodiment 5.

The grouping unit 140 first generates the cosine dictionary 156 by the cosine calculation unit 133. Moreover, the operation of the cosine calculation unit 133 is the same as that explained in embodiment 6, and its explanation will be omitted.

Next, the grouping unit 140 groups words by the grouping generation unit 141 using the interval association degree dictionary 153, the correlation degree dictionary 154, and the cosine dictionary 156. The operation of the grouping generation unit 141 is the same as the operation of the grouping generation unit 140 explained in embodiment 6.

Moreover, the group dictionary 155 generated by the above processing is the same as that explained in embodiment six.

In this manner, key words are accurately associated by the grouping unit 140 being provided with the cosine calculation unit 133 generating the cosine dictionary 156, and the group generation unit 141 determining grouping using three different criteria.

Moreover, in the present embodiment, in step S 64, the group generation unit 141 determines grouping using the values of three different criteria. In this way, it is preferable that many different criteria values be used in determining the grouping, but it is possible to determine grouping using two arbitrary criteria, one of which is the cosine value between the key words.

By the invention explained in the above embodiment 1 through embodiment 7, by finding the association degree between key words, or by grouping key words using the association degree, the effects are obtained that it is possible to find association degrees between key words that have become temporarily strong, and at the same time, it is possible to accurately and easily grasp what information is desired by many users.

Moreover, the following are examples of the use of the present invention:

1) a supplement for searching in information search systems

In information searches using an information search system, first an information search is carried out that has no omissions by using a query having broad concepts that include the information the user wants to search for, and further, the user modify the original query to search for relevant information. In the steps of query modification, by displaying to the searcher the key words associated with key words in the query used at first, the searcher can easily modify the original query simply by selecting the displayed key words.

2) use for ordering search results

In an information search system, generally information searched according to a query, is presented in the order it was found.

For searched information, finding the association degree between keywords included in the searched information and key words in the query, the searched information is presented in order starting from that with the highest association degree. In this manner, there is a high probability that the information the searcher needs will be displayed taking into account the search period as well. For example, when carrying out an information search using the key words "travel destination", the search results will be displayed in order of travel destinations according to the season when the search is carried out.

3) supplement in advertising displays

In the web page of a search engine for searching for Internet web pages, generally advertisements are displayed. There, by finding the association between key words included in the query input by the searcher and keywords provided by each advertiser, advertisements with high association will be displayed to the searcher on a web page. In this manner, during a search period, it is possible to display advertising which matches the content of the search, and thus high advertising effectiveness is achieved.

4) search supplement for unknown words

That is, it can be applied as a neologism dictionary. When the meaning a word may possibly have is unknown, by showing words that have an association with the unknown word, this word and its meaning can be generally understood.

5) analysis of social trends

If new groups of key words are found in the newest data, on the basis of the results of comparison between the data related to the newest grouping as shown in FIG. 31 and the data related to past groupings, it is understood that new information needs are being generated.

In addition, by producing a graph of data related to groupings such as that in FIG. 22, it can easily be grasped that new information needs are arising.

Additionally, by focussing on a certain key word and diachronically displaying changes in key words that have a high association degree with this key word, what information is actually desired at that time by users can be analyzed.

In this manner, by using the association degree between key words, it is possible to analyze social trends, and the results of this analysis can be used as a special index for information organizations.

Moreover, the program for realizing the functions of the association degree dictionary generation unit 110 and the group dictionary generation unit 120 in FIGS. 24, 25, and 26 can be recorded on a computer readable recording medium, and the program recorded on this recording medium read into the computer, and by executing this program the association degree between key words found and the key words grouped. Moreover, the meaning of the term "computer system" used here includes OS and hardware and peripheral systems. In addition, the meaning of "computer readable recording medium" includes portable media such as floppy disks, electromagnetic disks, and CD-ROMs, or a memory apparatus such as a hard disk built into a computer system. Furthermore, the meaning of "computer readable recording medium" includes, for example, communication lines when sending a program via a communication lines, such as a network like the internet or telephone lines, or RAM in a computer system which is a server or client when dynamically preserving programs for a short period of time. In addition, the above-mentioned program can be used to realize one portion of the above-described function, or can realize the above-described functions with a combination of programs recorded on a computer system.

What is claimed is:

1. An information associating apparatus comprising:
   a query extraction unit which compiles for at least each search user queries that were used in a past predetermined time interval taken from data comprising queries used in order to search for information,
   a preprocessing unit which calculates the parameters necessary for calculating the association degree between key words included in queries extracted for each search user by said query extraction unit, and
   an association degree calculation unit which calculates the association degree between key words using the parameters calculated by said preprocessing unit.

2. An information associating apparatus according to claim 1 wherein:
   said query extraction unit extracts the search time for each search user and said query from queries used for searching during said extracted past predetermined time interval,
   said preprocessing unit calculating for each of said search users the minimal time interval which is the smallest value among the time intervals between the time one query was used among said plurality of extracted queries and the time a different query was used among said plurality of extracted queries, and
   said association degree calculation unit calculates for each of said predetermined search users the association degree between said one query and said different query according to said minimum time interval based on said smallest time interval among the predetermined search users, and calculates the interval association degree for key words by adding the degree of association calculated for said plurality of search users.

3. An information associating apparatus according to claim 2 wherein
   said preprocessing unit parses said query into key words, and calculating for each of said search users the minimum time interval which is the smallest value among the time intervals between the time one key word among said parsed key words was used and a different key word among said parses key words was used, and
   said association degree calculation unit calculates for each of said predetermined users the association degree between said one key word and said different key word according to said minimum time interval based on said minimum time interval for the predetermined search user, and calculates the interval association degree for key words by adding said association degrees calculated for the plurality of said search users.

4. An information associating apparatus according to claim 2 wherein:
   said association degree calculation unit carries out further processing in which two key words according to one interval association degree and two key words according to another interval association degree are compiled into one group if the one key word among the two key words according to said one particular interval association degree and another key word according to another of said particular interval association degrees are identical when, after calculating the interval association degree of said key words, a plurality of particular interval degree association degrees exist in which said interval association degrees are equal to or greater then a particular interval association degree.

5. An information associating apparatus according to claim 1 wherein:

said query extraction unit compiles said queries for each search user in a predetermined time interval from queries used for searching during the said past predetermined time interval, said preprocessing unit calculates said parameters provided with a query parsing unit which parses said queries for each of said search users into key words, and a key word adding unit which calculates for each of said search users the number of uses of each of said key words in said predetermined time interval, and adds for all of said search users the number of uses of each of said key words calculated for each of said search users, and said association degree calculation unit calculates the correlation degree of key words by calculating the coefficient of correlation between two key words based on the number of uses of each of said key words in each of said predetermined time intervals which are added.

6. An information associating apparatus according to claim 5 wherein:

said association degree calculation unit carries out further processing in which two key words according to one particular correlation degree and two key words according to another particular correlation degree are compiled into one group if the one key word among the two key words according to said one particular correlation degree and another key word according to another of said particular correlation degrees are identical when, after calculating the correlation degree of said key words, a plurality of particular correlation degrees exist in which said correlation degrees are equal to or greater then a particular correlation degree.

7. An information associating apparatus according to claim 5 wherein:

said query parsing unit carries out further processing which eliminates redundancies of identical key words for one of said user units.

8. An information associating apparatus according to claim 1 further comprising:

an initialization unit which generates initial groups for grouping according the association degree between key words whose association degree is calculated by said association degree calculation unit, and a grouping unit which groups associated key words by using said initial group and an association degree dictionary that stores the association degree between key words calculated from said association degree calculation unit, and sequentially making the groups satisfying predetermined conditions into one group.

9. An information association apparatus according to claim 8 further comprising:

said association degree dictionary composed of an interval association degree dictionary which stores the correlation degree of key words found by calculating the association degree between said two key words based on the minimum time interval which is the smallest value among time intervals during which each query extracted for each search user was used from the queries used during the past predetermined period, and adding said association degrees calculated for a plurality of said search users, and a correlation degree dictionary which stores the correlation degrees for key words found by compiling said queries for each user for each predetermined time interval from queries used during said past predetermined time interval, calculating for each of said users the number of uses of key words among said queries within said predetermined time interval, adding said number of uses of each key word for all of said search users, and calculating the association degree between two key words based on the number of uses of each of said key words, and further characterized by:

said initialization unit which generates initial groups for grouping key words according to the interval association degree and the correlation degree stored in said interval association degree dictionary, and said grouping unit grouping associated key words by sequentially making groups satisfying predetermined conditions into one group using said initial groups and the interval association degree between key words stored in said interval association degree dictionary and the correlation degree between key words stored in said correlation degree dictionary.

10. An information associating apparatus according to claim 9 wherein:

said initialization unit generates each group including one different key word stored in said association degree dictionary, as said initial groups.

11. An information associating apparatus according to claim 9 wherein:

said initialization unit generates initial groups such that by using said interval association degree dictionary the interval association degree between all key words included in each group is larger than a predetermined threshold value.

12. An information associating apparatus according to claim 9 further characterized by:

said initializing unit further comprising a cosine calculation unit which calculates the cosine value between each key word by generating a vector for each word using the interval association degree between a predetermined key word and each key word by using said interval association degree dictionary, and calculating the cosine value between the vectors of two key words, and is further characterized in said initializing unit generating initial groups such that using the cosine value calculated by said cosine calculation unit the cosine values between all key words included in each group are larger than a predetermined threshold value.

13. An information associating apparatus according to claim 9 wherein:

said grouping unit groups associated words by grouping into one group if the value of the interval association degree is greater than its threshold value, or the value of the correlation degree is greater than its threshold value, for key words in which the association degree between all key words in said group and all key words on another group is the object of comparison.

14. An information associating apparatus according to claim 9 wherein:

said grouping unit further comprises a cosine calculation unit which calculates the cosine value between each key word by generating a vector for each key word using the interval association degree between a predetermined key word and each key word by using said interval association degree dictionary, and calculated the cosine value between the vectors of two key words, and said grouping unit groups associated key words by grouping them into one group if the value of the interval association degree is greater than its threshold value, or the value of the correlation degree is greater than the threshold value of the interval association degree, or the value of the cosine is larger then its threshold value, for key words in which the association degree between all key words in said group and all key words on another group is the object of comparison.

15. An information associating apparatus according to claim 12 wherein:

said grouping unit groups associated key words by grouping them into one group if the value of the interval association degree is greater than its threshold value, or the value of the correlation degree is greater than the threshold value of the interval association degree, or said cosine value found by said cosine calculation unit is greater than its threshold value, for key words in which the association degree between all key words in said group and all key words on another group is the object of comparison.

16. An information associating apparatus characterized in comprising:

a memory unit which stores an association degree dictionary storing the association degree between key words included in queries used for searching during a past predetermined time interval, an initialization unit which generates initial groups for grouping key words stored in said association degree dictionary according to the association degree, and a grouping unit which groups associated key words by sequentially making groups satisfying predetermined conditions into one group by using said initial groups and the association degree between key words stored in said association degree dictionary.

17. An information associating apparatus according to claim 16 wherein:

said association degree dictionary comprises an interval association degree dictionary storing the interval association degree for key words found by calculating the association degree of said two queries based on the smallest time interval which is the smallest value among time intervals in which each query extracted for each search user from queries used in said past predetermined period, and adding said association degrees calculated for a plurality of said search users, and said grouping unit groups associated key words by making them into one group if the interval association value between any key words in said group and any key words in another group is equal to or greater than a predetermined value.

18. An information associating apparatus according to claim 16 wherein:

said association degree dictionary comprises a correlation degree dictionary which stores the degree of correlation between key words found by compiling said query for each search user for each predetermined time period from the queries used during said past predetermined time interval, calculating for each of said search users the number of uses of each key word for all of said search users, and based on the number of uses of each of said key words, calculating the association degree between two key words, and said grouping unit groups associates key words by making them into one group if the correlation degree between any key words on said group and any key words of another group are equal to or greater than a predetermined value.

19. An information associating apparatus according to claim 16 wherein:

said association degree dictionary composed of an interval association degree dictionary which stores the degree of interval association found by calculating the association degree between said two queries based on the minimum time interval which is the smallest value among time intervals in which each of said extracted queries for each search user from queries used for searching during a past predetermined time interval, and adding said association degrees calculated for a plurality of each of said search users, and a correlation degree dictionary which stores the degree of correlation of key words found by compiling the queries for each search user in a predetermined time interval from queries used for searching during said past predetermined time interval, calculating for each of said users the number of uses of key words among said queries in each predetermined time interval, calculating the number of uses of each key word for all of said search users, and calculating the coefficient of correlation between two key words based on the number of uses of each key word, and further characterized in said initialization unit generating initial groups for grouping key words according to the interval association degree and the correlation degree stored in said interval association degree dictionary, and said grouping unit grouping associated key words by sequentially making the groups which satisfy predetermined conditions into one group using said initial groups and the interval association degree of key words stored in said interval association degree dictionary and the correlation degree of key words stored in said correlation degree dictionary.

20. An information associating apparatus according to claim 19 wherein:

an initialization unit generates groups including one different key word stored in said association degree dictionary, as said initial groups.

21. An information associating apparatus according to claim 19 wherein:

said initialization unit generates initial groups such that by using said interval association degree dictionary the interval association degree between all key words included in each group is larger than a predetermined threshold value.

22. An information associating apparatus according to claim 19 wherein:

said initialization unit further comprises a cosine calculation unit which calculates the cosine value between each key word by generating a vector for each key word using the interval association degree between a predetermined key word and each key word by using said interval association degree dictionary, and calculating the cosine value between the vectors of the two key words, and further characterized in said initialization unit generating initial groups such that by using the cosine value calculated by said cosine calculation unit the cosine value between all key words included in each group is larger that a predetermined value.

23. An information associating apparatus according to claim 19 wherein:

said grouping unit groups associated words by grouping them into one group if the value of the interval association degree is greater than its threshold value, or the value of the correlation degree is greater than its threshold value, for key words in which the association degree between all key words in said group and all key words on another group is the object of comparison.

24. An information associating apparatus according to claim 19 wherein:

grouping unit being further comprises a cosine calculation unit which generates vectors for each key word using the interval association degree between a predetermined key word and each key word by using said interval association degree dictionary, and calculating the cosine value between the two key words, and further characterized in said grouping unit grouping associated words by grouping them into one group if the value of the interval association degree is greater than its threshold value, or the value of the correlation degree is greater than the threshold value of the interval association degree, or the value of the cosine is larger than its threshold value, for key words in which the association degree between all key words in said group and all key words on another group is the object of comparison.

25. An information associating apparatus according to claim 22 wherein:

said grouping unit groups associated words by grouping them into one group if the value of the interval association degree is greater than its threshold value, or the value of the correlation degree is greater than the threshold value of the interval association degree, or the value of the cosine found by said cosine calculation unit is larger than its threshold, for key words in which the association degree between all key words in said group and all key words on another group is the object of comparison.

26. An information associating method comprising the steps of:

query extraction, in which queries are compiled at least for each search user that used the queries used during a past predetermined time interval taken from data of accumulated queries used in order to search for information, preprocessing, in which parameters necessary for calculating the association degree of key words included in queries extracted for each of said search users, and association degree calculation, in which the association degree between key words is calculated using said calculated parameters.

27. An information association method according to claim 26 wherein:

said query extraction step extracts the search time for each search user and said query from said extracted queries used during the past predetermined time interval, said preprocessing step calculates said parameters by calculating for each of said search users the minimal time interval which is the smallest value among the time intervals between the time one query among a plurality of said extracted queries was used and the time a different query among the a plurality of said extracted queries was used, and said association degree calculation step calculates the interval association degree between key words by calculating for each of said predetermined search users the association degree between said one query corresponding to said minimal time interval and said difference query based on said minimum time intervals for the predetermined search user, and calculates the interval association degree for key words by adding the degree of association calculated for said plurality of search users.

28. An information associating method according to claim 26 wherein:

said query extraction step compiles queries for each search user for each predetermined time interval from the said extracted queries used during a past predetermined time interval, and said preprocessing unit includes the steps of parsing said queries for each of said users into key words, adding for all of said search users the number of uses of each key word calculated for each of said users by calculating for each of said users the number of uses of each of said key words in each of said predetermined time intervals, and finds said parameters by each of said steps, and said association degree calculation step calculates the association degree for key words by calculating the coefficient of correlation between two key words based on the number of uses of each of said extracted key words during said predetermined time interval.

29. An information associating method according to claim 26 which further comprising the steps of:

initialization by generating initial groups for grouping key words whose association degree has been calculated according to the association degree by said association degree calculation step, and grouping associated key words by sequentially making the groups which satisfy predetermined conditions into one group by using said initial groups and the association degree of key words calculated by said association degree calculation step.

30. An information associating method comprising the steps of:

initialization in which initial groups are generated for grouping key words stored in said association degree dictionary according to the association degree using the association degree dictionary storing the association degree of key words included in queries used for searching in a past predetermined time interval, and grouping associated key words by sequentially making the groups which satisfy predetermined conditions into one group by using said initial groups and the association degree of key words stored in said association degree dictionary.

31. An information associating apparatus according to claim 30 wherein:

said association degree dictionary comprises an interval association degree dictionary which stores the degree of interval association of key words found by calculating the association degree of two key words based on the minimal time interval which is the smallest value among time intervals in which each of said extracted queries for each search user from the queries used during said past predetermined time interval, and adds said association degrees calculated for a plurality of said search users, and a correlation degree dictionary which stores the degree of correlation of key words found by compiling said queries in each predetermined time interval from queries used during said past predetermined time interval, calculating for each of said search users the number of uses of key words in said queries in said predetermined time interval, adding said number of uses for all of said search user, and calculating the coefficient of correlation between two key words, and further characterized by the steps of:

said initialization step generating initial groups for grouping key words according to the interval association degree and the correlation degree stored in said interval association degree dictionary, and said grouping step grouping associated key words by sequentially making the groups which satisfy predetermined conditions into one group by using said initial groups and the degree of interval association of key words stored in said interval association degree dictionary and the correlation degree of key words stored in said correlation degree dictionary.

32. An information associating method according to claim 31 wherein:

said grouping step groups associated key words into one group if the interval association degree is equal to or greater than its threshold value, or the value of correlation degree is equal to or larger than its threshold value for key words for which the association degree between all key words in said groups and all key words in another group is the object of comparison.

* * * * *